(12) United States Patent
Nagy

(10) Patent No.: US 12,315,353 B1
(45) Date of Patent: May 27, 2025

(54) PATIENT SAFETY MONITORING METHOD AND APPARATUS

(71) Applicant: Invisalert Solutions, Inc., West Chester, PA (US)

(72) Inventor: Peter A Nagy, Newtown Square, PA (US)

(73) Assignee: Invisalert Solutions, Inc., West Chester, PA (US)

( * ) Notice: Subject to any disclaimer, the term of this patent is extended or adjusted under 35 U.S.C. 154(b) by 0 days.

(21) Appl. No.: 18/826,171

(22) Filed: Sep. 5, 2024

Related U.S. Application Data

(60) Provisional application No. 63/656,097, filed on Jun. 4, 2024.

(51) Int. Cl.
| | |
|---|---|
| G08B 21/02 | (2006.01) |
| G01S 13/88 | (2006.01) |
| G01S 13/89 | (2006.01) |
| G08B 21/18 | (2006.01) |
| G08B 21/22 | (2006.01) |

(52) U.S. Cl.
CPC ............ G08B 21/02 (2013.01); G01S 13/886 (2013.01); G01S 13/89 (2013.01); G08B 21/182 (2013.01); G08B 21/22 (2013.01)

(58) Field of Classification Search
CPC ...... G08B 21/02; G08B 21/182; G08B 21/22; G01S 13/886; G01S 13/89
See application file for complete search history.

(56) References Cited

U.S. PATENT DOCUMENTS

| | | |
|---|---|---|
| 5,077,666 A | 12/1991 | Brimm et al. |
| 5,218,344 A | 6/1993 | Ricketts |
| 5,769,290 A | 6/1998 | Pestana |
| 6,225,906 B1 | 5/2001 | Shore |
| 6,406,426 B1 | 6/2002 | Reuss et al. |
| D507,798 S | 7/2005 | Jewitt et al. |
| 6,954,148 B2 | 10/2005 | Pulkkinen et al. |
| 7,154,397 B2 | 12/2006 | Zerhusen et al. |
| 7,242,306 B2 | 7/2007 | Wildman et al. |
| 7,382,247 B2 | 6/2008 | Welch et al. |
| D577,364 S | 9/2008 | Flynt et al. |

(Continued)

FOREIGN PATENT DOCUMENTS

| | | |
|---|---|---|
| GB | 2426180 A | 11/2006 |
| GB | 2549099 A | 10/2017 |

(Continued)

OTHER PUBLICATIONS

Consumer Cellular; Huawei 8652—managing contacts; 1 page (Screenshot); retrieved from the internet (https://www.youtube.com/watch?v=oCazslu6NLg on Sep. 17, 2012.

(Continued)

*Primary Examiner* — Daryl C Pope
(74) *Attorney, Agent, or Firm* — Shay Glenn LLP

(57) ABSTRACT

Methods and apparatuses for monitoring a patient in a healthcare setting may include one or more radar transducers to monitor a monitoring region to detect and prevent patient assaults and self-harm. The radar transducers, which may include millimeter wave, lidar, and ultrasonic transducers, can determine and track patient's location and determine patient welfare. Also described herein are systems configured to interpret patient movement.

25 Claims, 19 Drawing Sheets

(56) References Cited

U.S. PATENT DOCUMENTS

| | | | |
|---|---|---|---|
| 7,450,015 | B2 | 11/2008 | Singer et al. |
| D588,152 | S | 3/2009 | Okada |
| D588,153 | S | 3/2009 | Okada |
| 7,541,935 | B2 | 6/2009 | Dring et al. |
| 7,570,152 | B2 | 8/2009 | Smith et al. |
| D599,363 | S | 9/2009 | Mays |
| D607,001 | S | 12/2009 | Ording |
| 7,642,290 | B2 | 1/2010 | Kaplan |
| D614,641 | S | 4/2010 | Viegers et al. |
| 7,764,167 | B2 | 7/2010 | Reeves et al. |
| 7,825,794 | B2 | 11/2010 | Janetis et al. |
| D643,436 | S | 8/2011 | Lemay |
| D656,157 | S | 3/2012 | Khan et al. |
| D656,503 | S | 3/2012 | Brierley et al. |
| D682,262 | S | 5/2013 | Akana et al. |
| 8,605,094 | B1 | 12/2013 | Alfaro et al. |
| D701,229 | S | 3/2014 | Lee |
| D701,521 | S | 3/2014 | Kim et al. |
| D715,820 | S | 10/2014 | Rebstöck |
| D718,779 | S | 12/2014 | Hang Sik et al. |
| D720,766 | S | 1/2015 | Mandal et al. |
| D724,603 | S | 3/2015 | Williams et al. |
| 8,984,436 | B1 | 3/2015 | Tseng et al. |
| 9,064,391 | B2 | 6/2015 | Vardi et al. |
| D765,110 | S | 8/2016 | Liang |
| D789,956 | S | 6/2017 | Ortega et al. |
| D797,133 | S | 9/2017 | Marcolongo et al. |
| 9,928,713 | B2 | 3/2018 | Baczuk et al. |
| D820,850 | S | 6/2018 | Tekamp et al. |
| 10,410,498 | B2 * | 9/2019 | Coke ................ G08B 21/0423 |
| D861,719 | S | 10/2019 | Van Der Molen |
| D866,586 | S | 11/2019 | Suter et al. |
| 10,482,753 | B2 | 11/2019 | Nelson et al. |
| D873,278 | S | 1/2020 | Nakahara et al. |
| D875,767 | S | 2/2020 | Farnan et al. |
| D892,151 | S | 8/2020 | Pontious |
| D906,359 | S | 12/2020 | Nagy et al. |
| 10,896,590 | B2 | 1/2021 | Nagy et al. |
| 11,210,918 | B2 | 12/2021 | Nagy et al. |
| 11,682,283 | B2 | 6/2023 | Nagy et al. |
| 12,094,318 | B2 | 9/2024 | Nagy et al. |
| 2002/0060630 | A1 | 5/2002 | Power |
| 2002/0196147 | A1 | 12/2002 | Lau |
| 2005/0094205 | A1 | 5/2005 | Lo et al. |
| 2007/0118813 | A1 | 5/2007 | Forstall et al. |
| 2007/0129983 | A1 | 6/2007 | Scherpbier et al. |
| 2007/0267475 | A1 | 11/2007 | Hoglund et al. |
| 2008/0012767 | A1 | 1/2008 | Caliri et al. |
| 2008/0015903 | A1 | 1/2008 | Rodgers |
| 2008/0027288 | A1 | 1/2008 | Renz |
| 2009/0019890 | A1 | 1/2009 | Kirknoff |
| 2009/0075694 | A1 | 3/2009 | Kim et al. |
| 2009/0299827 | A1 | 12/2009 | Puri et al. |
| 2010/0026510 | A1 | 2/2010 | Kiani et al. |
| 2010/0066541 | A1 | 3/2010 | Craine |
| 2010/0090971 | A1 | 4/2010 | Choi et al. |
| 2010/0201821 | A1 | 8/2010 | Niem et al. |
| 2010/0217618 | A1 | 8/2010 | Piccirillo et al. |
| 2010/0249540 | A1 | 9/2010 | Lisogurski |
| 2010/0253521 | A1 | 10/2010 | Williams, Sr. et al. |
| 2011/0082808 | A1 | 4/2011 | Beykpour et al. |
| 2011/0105854 | A1 | 5/2011 | Kiani et al. |
| 2011/0109461 | A1 | 5/2011 | Aninye |
| 2011/0179387 | A1 | 7/2011 | Shaffer et al. |
| 2011/0191124 | A1 | 8/2011 | Sung et al. |
| 2011/0197163 | A1 | 8/2011 | Jegal et al. |
| 2012/0095822 | A1 | 4/2012 | Chiocchi |
| 2012/0130730 | A1 | 5/2012 | Setlur et al. |
| 2012/0154582 | A1 | 6/2012 | Johnson et al. |
| 2012/0184207 | A1 | 7/2012 | Gaines et al. |
| 2013/0018673 | A1 | 1/2013 | Rubin |
| 2013/0132908 | A1 | 5/2013 | Lee et al. |
| 2013/0145663 | A1 | 6/2013 | Greer |
| 2013/0218583 | A1 | 8/2013 | Marcolongo et al. |
| 2013/0227486 | A1 | 8/2013 | Brinda |
| 2014/0067770 | A1 | 3/2014 | Cheong et al. |
| 2014/0189608 | A1 | 7/2014 | Shuttleworth et al. |
| 2014/0283142 | A1 | 9/2014 | Shepherd et al. |
| 2015/0084769 | A1 | 3/2015 | Messier et al. |
| 2015/0170504 | A1 | 6/2015 | Jooste |
| 2015/0242665 | A1 | 8/2015 | Antonescu et al. |
| 2015/0264647 | A1 | 9/2015 | Lacatus et al. |
| 2016/0026837 | A1 | 1/2016 | Good et al. |
| 2016/0078752 | A1 | 3/2016 | Vardi |
| 2016/0109853 | A1 | 4/2016 | Kobayashi |
| 2016/0239778 | A1 | 8/2016 | Suneja |
| 2016/0253470 | A1 | 9/2016 | Marcolongo et al. |
| 2017/0116560 | A1 | 4/2017 | Wickstrom et al. |
| 2017/0243056 | A1 | 8/2017 | Cheng et al. |
| 2018/0065248 | A1 | 3/2018 | Barral |
| 2018/0165937 | A1 | 6/2018 | Devdas et al. |
| 2019/0034592 | A1 | 1/2019 | Gupta et al. |
| 2019/0043337 | A1 | 2/2019 | Liu et al. |
| 2019/0146550 | A1 | 5/2019 | Berardinelli |
| 2020/0201260 | A1 | 6/2020 | Rodriguez et al. |
| 2020/0357502 | A1 | 11/2020 | Lee et al. |
| 2021/0125709 | A1 | 4/2021 | Qian et al. |
| 2021/0287783 | A1 | 9/2021 | Jhaveri |
| 2021/0289319 | A1 | 9/2021 | Antony et al. |
| 2022/0301407 | A1 | 9/2022 | Nagy et al. |
| 2022/0327360 | A1 * | 10/2022 | Merlin ................ H04B 17/318 |
| 2022/0328180 | A1 * | 10/2022 | Chelles ................ G16H 40/67 |
| 2023/0350004 | A1 * | 11/2023 | Cnaan-On ............... G01S 13/42 |
| 2024/0046768 | A1 | 2/2024 | Nagy et al. |
| 2024/0404391 | A1 | 12/2024 | Nagy et al. |

FOREIGN PATENT DOCUMENTS

| | | |
|---|---|---|
| WO | WO02/082348 A2 | 10/2002 |
| WO | WO2016/102506 A1 | 6/2016 |
| WO | WO2023/076950 A1 | 5/2023 |

OTHER PUBLICATIONS

Contacts Like Listview: Contacts like listview—stack overflow; 1 page; retrieved from the internet (http://stackoverflow.com/questions/5017080/contacts-like-listview) on Feb. 16, 2011.

invisalertsolutions.com; 15-minute checks psychiatry inpatient setting; Feb. 16, 2018; 2 pages retrived from the internet (https://www.invisalertsolutions.com/>(year:2018); on Aug. 18, 2020.

Google Drive Blog; Rapid wireframe sketching in google docs; 2pages; retrived from the internet (https://drive.googleblog.com/2010/05/rapid-wireframe-sketching-in-google-docs.htm) on May 2010.

Java; How to add my app icon in contact list of users' android phone—stack overflow; 1 pages retrieved from the internet (https:stackoverflow.com/questions/25029855/how-to-add-my-app-icon-in-contact-list-of-users-android-phone) on Aug. 18, 2020.

Mcnickle; 7 E-Health tools to get patients engaged; 5 pages; retrieved from the internet (http://www.informationweek.com/healthcare/patient-tools/7-e-health-tools-to-get-patients-engaged/d/d-id/1106716) on Oct. 8, 2012.

Pandey; [How-to] Backup your phone contacts to google; 1 page (Screenshot); retrieved from the interent (http://www.youtube.com/watch?v=vZwvc-7CCf4) on Nov. 15, 2012.

Sain Lukes College on Google Play Reviews; Similar play app stats; 1 page; retrived from the internet (https://www.similarplay.com/dublabs/saint_lukes_college/apps/com.dud.app.saintlukes) on Aug. 18, 2020.

Vladleevideo; Quick Contacts for Android, 2 pages (Screenshot); retrieved from the internet (https://www.youtube.com/watch?v=iRn97Neh-cY) on Apr. 18, 2017.

Winarno; How to backup contacts on samsung S4; 1 page (Screenshot); retrieved from the internet (https://www.youtube.com/watch?v=_MN9RbuV9Vc>); on Jul. 7, 2014.

Marcolongo et al.; U.S. Appl. No. 29/550,879, entitled "Graphical user interface for display screen or portion thereof," filed Jan. 7, 2016.

Albert et al.; U.S. Appl. No. 18/686,348 entitled "Tamper-resistant wearable band," filed Feb. 23, 2024.

(56) References Cited

OTHER PUBLICATIONS

Nagy; U.S. Appl. No. 18/705,441 entitled "Method and apparatus for preventing elopement," filed Apr. 26, 2024.
Welker; U.S. Appl. No. 18/976,319 entitled "Secure mobile device management," filed Dec. 10, 2024.
Nagy et al.; U.S. Appl. No. 18/955,963 entitled "Apparatus and method for monitoring compliance with patient care protocols" filed Nov. 21, 2024.

\* cited by examiner

PATIENT SAFETY MONITORING METHOD AND APPARATUS

CLAIM OF PRIORITY

This patent application claims priority to U.S. Provisional Patent Application No. 63/656,097, titled "PATIENT SAFETY MONITORING METHOD AND APPARATUS," filed on Jun. 4, 2024, herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are apparatuses (e.g., devices, systems, etc.) and methods for monitoring a patient's safety in a healthcare setting.

BACKGROUND

Healthcare facilities can be busy and chaotic. Patients can move about the facility and, in some cases, suffer assault or self-harm without notice. If there are no monitoring systems in place, a patient may enter unauthorized areas or leave the facility. Real-time location systems (RTLS) are sometimes used in hospitals or other healthcare facilities to provide location of patients or assets. Generally, these systems are expensive to buy, install and maintain. Further, many RTLS systems may have limited accuracy in determining a patient's location. Some systems with increased accuracy or resolution may be cost prohibitive and difficult to install. Video monitoring systems are often impractical due to privacy concerns.

Conventional patient monitoring systems may require supervision or monitoring by a trained healthcare worker. This labor requirement may limit the number of patients that can be monitored and also can introduce substantial human error into the monitoring operation. Patient monitoring may extend beyond simply determining the patient's location. Other aspects of patient monitoring may include detecting possible assault, detecting circumstances which may lead to strangulation or self-harm, and accurately monitoring patient welfare.

Thus, there exists a need for an accurate patient monitoring system.

SUMMARY OF THE DISCLOSURE

Described herein are apparatuses, systems, and methods to track the location of one or more patients and monitor one or more aspects of the patient's welfare, particularly within a healthcare setting such as a hospital, residential treatment centers, and the like. In general, one or more transducers may be installed within areas to be monitored (monitoring regions) to generate a three-dimensional (3D) point cloud of the monitoring regions. Analysis of the 3D point cloud can show the presence and location of one or more patients as well as identify the presence and location of other objects within the monitoring region. Notification alerts can be sent to monitoring personnel based on the location of the patients and (optionally) based on detected secondary indicia. In general, an alert may refer to any feasible email, text message, software notification, or the like that can be delivered to any monitoring personnel.

Secondary indicia can refer to any of a number of objects or patient related actions that can be used to assess the welfare of the patient. Some examples of secondary indicia can include dwell time (a time period associated with the presence of the patient at a particular location), monitoring zone crossings, patient vital signs (respiration rate, heart rate, etc.), detection of ligature, and the like. Thus, based on the location of a patient and the secondary indicia, the patient's welfare may be monitored and, if necessary, notification alerts can be transmitted personnel to review and address any patient safety issues.

In some examples, a monitoring system can monitor patient welfare with respect to patient location as well as determine if the patient may be considering self-harm or is a possible victim of an assault. The monitoring may be performed without manual (human) intervention and also offer privacy to the patient since the use of video cameras can be avoided.

In some examples, the location of a patient may be determined with transducers and information from a patient-worn device. Using both transducers and patient-worn devices can help expand a monitoring region as well as provide a concrete identity a person identified within a 3D point cloud.

For example, a method of detecting an assault within a patient's room in a healthcare facility may include: generating, using a millimeter wave radar system within a room of the healthcare facility, a point cloud within a coordinate system corresponding to the patient's room; determining, from the point cloud, proximity between a first representative point or a first set of points of the point cloud corresponding to a first person and a second representative point or second set of points of the point cloud corresponding to a second person; monitoring the first representative point or first set of points and the second representative point or second set of points; and triggering an assault alert when a proximity between the first representative point or first set of points and the second representative point or second set of points is less than a proximity threshold for a duration that is equal to or greater than a duration threshold.

Any of these methods may include determining a location of the representative first point by identifying a first centroid of a first set of moving points from the point cloud and/or determining a location of the first set of points from the first set of moving points from the point cloud, and determining a location of the representative second point by identifying a second centroid of a second set of moving points from the point cloud and/or determining a location of the second set of points from the second set of moving points from the point cloud. The proximity threshold value may be based on a location within the room of the healthcare facility. The proximity threshold value may be lower for a region of the location corresponding to a bed.

Any of these methods may include confirming the identity of the first person and/or the second person based on a wearable sensor worn by the first person and/or the second person.

Triggering the assault alert may comprises one or more of: sending a text, sending an email, emitting an alarm. In some cases triggering the assault alert comprises triggering the alert to a healthcare worker. Any of these methods may include triggering a second alert when the first set of points corresponding to the first person enters the room. The proximity threshold may be 1.5 feet or less (1 foot or less, 0.75 feet or less, 0.5 feet or less, etc.).

The duration threshold may comprise about 1 second (about 2 seconds, about 3 seconds, about 4 seconds, about 5 seconds, about 10 seconds, etc.).

Also described herein are systems for performing any of these methods. For example, a system for detecting an assault within a room of a healthcare facility may include: a millimeter wave radar transducer; one or more processors comprising a non-transitory computer-readable storage medium including instructions that, when executed by one or more processors, cause the one or more processors to perform a method comprising: generating, using the millimeter wave radar transducer within the room, a point cloud within a coordinate system corresponding to the patient's room; determining, from the point cloud, proximity between a first representative point or a first set of points of the point cloud corresponding to a first person and a second representative point or second set of points of the point cloud corresponding to a second person; monitoring the first representative point or first set of points and the second representative point or second set of points; and triggering an assault alert when a proximity between the first representative point or first set of points and the second representative point or second set of points is less than a proximity threshold for a duration that is equal to or greater than a duration threshold.

Any of the methods described herein includes receiving or obtaining, from a transducer, a three-dimensional (3D) point cloud of a first room; determining, based on the 3D point cloud, a location of a first person in the first room; determining, based on the 3D point cloud, a location of a second person in the first room; and determining, based on the location of the first person and the location of the second person, a physical contact between the first person and the second person.

Any of the methods described herein can include determining a location of a first bed in the first room associated with the first person; and determining that the location of the second person is coincident with the first bed, where determining the physical contact is based on determining that the location of the second person is coincident with the first bed. In some examples, determining physical contact is based on determining that the location of the second person is within the first monitoring zone. In some cases, the first monitoring zone can be surrounding the first bed.

Any of the methods described herein can include determining a location of a second bed in the first room; establishing a second monitoring zone surrounding the second bed; determining that the location of the first person is within the second monitoring zone; and determining the physical contact between the first person and the second person when the first person crosses the second monitoring zone.

Any of the methods described herein can include determining a location of a third person crossing the first monitoring zone or the second monitoring zone; and determining the physical contact based determining the location of the third person crossing the first monitoring zone or the second monitoring zone.

Any of the methods described herein can include sending or generating a notification alert based on inferring or determining the physical contact and or self-harm, and in some cases, inferring the category or type of physical contact (e.g., assault, self-harm, etc.). Generally, the notification alerts can be transmitted or sent to any feasible member of a monitoring staff. The notification alerts can be sent to any feasible mobile device, tablet computer, and the like. In some examples, the apparatus or method may include detecting, determining and/or monitoring a vital sign. The vital signs may be used to characterize the type of physical contact. In some cases, physical contact may be characterized as an assault, and/or patient self-harm may be inferred, when the at least one vital sign exceeds a threshold. The at least one vital sign can include a heart rate, a respiration rate, a body temperature, or a combination thereof.

In some examples, the transducer is a millimeter wave (mmWave) transducer, a lidar transducer, an ultrasound transducer, or a combination thereof. In general, these modalities may all be referred to herein as 'radar'. Although many of the examples described herein are in reference to mmWave systems, it should be understood that these systems and techniques may be used with Lidar, or ultrasound instead or in addition to mmWave.

The methods and apparatuses described herein may be used with or without a wearable device. Wearable devices may be used to augment the systems (including the 'radar', e.g., millimeter wave, systems) described herein. For example, any of the methods and apparatuses described herein can include determining or confirming patient identity, proximity, and/or vital signs in combination with a wearable device. The wearable device may provide "macro" location data of the first person within the healthcare setting, including monitoring the person outside of a patient room. For example, these apparatuses (e.g., systems) may monitor and generate a location history file based on the location data from the wearable device within a facility, and may augment this information based on data from the radar system(s) within a room, including 3D point cloud data. Patient identity and associated information may be correlated to the radar information using a wearable device. Alternatively, as described herein, the radar system may be configured to infer or confirm patient identity based on location data (e.g., assigned bed, etc.) from the radar system.

Determining physical contact may generally be based on velocity vectors associated with the first person. The velocity vector(s) may be estimated from the radar data (e.g., mmWave radar data). Thus any of these apparatuses and systems may estimate velocity from the point cloud information and may estimate velocity from the aggregate or average of the point cloud and/or from regions of the point cloud (e.g., based on tracking velocity of all or some sub-regions of the point cloud, tracking maximum velocity, the distribution of velocity from the point cloud, etc.). In some cases, a magnitude of at least one of the velocity vectors exceeds a predetermined value. In some examples, any of the methods described herein can include generating a system log that includes notification alerts, 3D point cloud data, patient location, secondary indicia, or a combination thereof.

The point cloud data may be segmented to identify particular patients or non-patient objects. Segmentation may generally assign an identifier to set of point cloud information corresponding to patients or objects within the room. Any appropriate segmentation technique may be used.

Any of the methods described herein can include a method of monitoring patient welfare within a healthcare setting. The method can include receiving or obtaining, from a transducer, a 3D point cloud of a monitoring area; determining, based on the 3D point cloud, a respiration rate of a patient; determining, based on the respiration rate, a patient's welfare; and sending an alert notification to monitoring staff based on the patient's welfare.

In general, the methods described herein can include determining, based on the 3D point cloud, a current location of the patient within a patient's room; and determining a dwell time that describes a time period when the patient is within a predetermined distance of the current location, where determining the patient's welfare is further based on the dwell time and the current location. In some examples, the dwell time exceeds a predetermined threshold. For example, dwell time may be used to infer patient welfare where the patient is positioned within the room at or near the back of a doorframe for a period of time exceeding a threshold, which may indicate an attempt at self-harm (e.g., hanging, asphyxiation, etc.). In some examples, determining the patient's welfare further may include determining whether the current location of the patient is on a floor, on a bed, or next to a doorway. Further, determining the patient's welfare is based on determining the presence of a ligature.

For example, any of the methods described herein can include a method of detecting strangulation within a patient's room. In some examples, the method can includes receiving or obtaining, from a transducer, a three-dimensional (3D) point cloud of a patient's room; determining, based on the 3D point cloud, a location of a doorway in the patient's room; determining, based on the 3D point cloud, a current location of a patient; and sending a strangulation alert based on the current location of the patient and the location of the doorway.

In any of the methods described herein, the current location of the patient is within a predetermined distance of the doorway. In some examples, sending the strangulation alert is based on a dwell time exceeding a predetermined time period. In some other examples, sending the strangulation alert is based on locating the ligature. The ligature can be located near the top or the bottom of the doorway. In some cases, sending the strangulation alert is based on the door state (door open or door closed). Sending the strangulation alert is based on the at least one vital sign of the patient.

Any of the apparatuses disclosed can include multiple transducers. In some examples, a first transducer is configured to determine when physical contact occurs between two or more people within a monitoring area; a second transducer is configured to determine patient welfare within the monitoring area; and a processor coupled to the first transducer and the second transducer configured to transmit notification alerts regarding physical contact, patient welfare, or a combination thereof.

In any of the apparatuses disclosed herein may include a third transducer configured to determine strangulation events within the monitoring area. The processor is coupled to the third transducer and is further configured to transmit notification alerts regarding strangulation events. The first transducer is a millimeter wave (mm Wave) transducer, a lidar transducer, an ultrasound transducer, or a combination thereof (generally a 'radar' transducer).

Any of these methods and apparatuses may be used with an environmental sensor sensing sound (e.g., sound volume/intensity and/or duration, e.g., to detect yells, screams, etc., language detection, such as natural language detection to detect keywords indicating distress/assault, etc.), light (e.g., light intensity, such as day/night, room lights on/off, etc.), and/or time of day (e.g., clock) and schedule (patient-specific or institution-specific schedules) to help inform inference about patient wellbeing, including assault and/or self-harm.

As will be described in greater detail herein, any of these methods and apparatuses may be configured to optimize anonymity of patients and ensure patient privacy while still monitoring for patient well-being and alerting caregivers. In particular, any of the sensors (optical, sound, etc.) may be configured to prevent storing or transmitting actual/literal images of the patient and may instead use non-representational detection (e.g., point cloud, filtered/blurred, etc.) that allows determination only of body position, gestures, movements, accelerations, etc. but cannot be used to provide realistic (e.g. photorealistic) images of the patient. Similarly, sound may be monitored but not recorded directly (instead recording only detection of phrases or keywords from spoken language and/or volume and/or cadence information) to infer patient well-being.

The methods and apparatuses described herein may infer patient well-being based on time of day (e.g., by adjusting the threshold for assault or self-harm when analyzing sensor data to be lower or more sensitive when the lights are out and/or in the evenings/sleeping periods, etc.). In some cases the intensity of the light (lights on/off) may modify the patient monitoring and may inform the inference of assault or self-harm. It is more likely that patient movement (and particularly movement out of bed) may be part of an assault or self-harm when the lights are off/low within the room. Thus, any of these apparatuses may include a light intensity sensor, and may adjust the analysis thresholds based on the light intensity.

Thus, described herein are methods and apparatuses for determining an assault based on proximity to a bed within the room. Radar systems, and particularly mm Wave radar systems, may have difficultly when distinguish objects, including people. The methods and apparatuses described herein may instead detect movement. Many mm Wave radar systems filter on movement, e.g., points having a doppler shift, in order to determine which points to return data on, such as coordinates (e.g., X, Y, Z location coordinates) and/or velocity data. This may be performed within firmware of the radar sub-system (e.g., radar chip). Thus, any of these apparatuses may provide radar data including one or more points that are associated with movement. Radar may be capable of returning data on any point (e.g., static) within the coordinate space. In the methods and apparatuses described herein, the coordinate (e.g., X, Y, Z) points received may be those that have been associated with movement. Points may be returned at a sampling frequency (e.g., s times per second, such as at s Hz, e.g., 1 Hz, 5 Hz, 10 Hz, 20 Hz, 30 Hz, 40 Hz, 50 Hz, 100 Hz, etc.) and for each set of points or "frame", the method and apparatus may display the returned points which define the human body (or anything moving) and as well as the centroid of those points. Displaying this points over time may be used to create a video showing the movement of point cloud. This may make it particularly hard to determine an absolute distance between people in a room. In some examples this limitation may be overcome by training a neural network, but a particularly surprisingly effective approximation may instead use a known environmental map/coordinate system, which is stably present. In some health care settings, such as a psychiatric ward, or a punitive setting (e.g., prison), furniture such as beds are typically secured in known positions. Thus, the methods and systems described herein may determine centroids corresponding to movements of individuals and may compare the positions of these centroids relative to a bed. If the two centroids (corresponding to two individuals) are both on a bed, as determined by within the coordinate system, then an assault may be indicated.

For example, a method of detecting an assault within a room of a healthcare facility may include: generating, using a radar system within the room, a point cloud derived from an image of the room, wherein the room includes a bed at a fixed location within a coordinate system corresponding to the room; determining, from the point cloud, a location of a representative first point or first set of points of the point cloud corresponding to a first person; determining, from the point cloud, a location of a second representative point or second set of points of the point cloud corresponding to a second person; and triggering an assault alert when the first representative point or first set of points and the second representative point or second set of points are both within a region of the coordinate system comprising the bed.

Determining the location of the representative first point or first set of points of the point cloud corresponding to the first person may include determining a relative position of a first centroid of the first set of points, and determining the location of the second representative point or second set of points of the point cloud corresponding to the second person may include determining a relative position of a second centroid of the second set of points. In some cases determining the location of the representative first point or first set of points of the point cloud corresponding to the first person comprises determining based on a relative movement of points within the point cloud, and wherein determining the location of the representative second point or second set of points of the point cloud corresponding to the second person comprises determining based on relative movement of points within the point cloud.

Triggering may comprise triggering the assault alert when the first representative point or first set of points and the second representative point or second set of points are both within the region of the coordinate system comprising the bed for greater than a duration threshold. The duration threshold may be about 1 second or more; in some examples, the duration threshold is about 10 seconds or more.

The region of the coordinate system comprising the bed may extend about in some case adjacent to the bed. For example, the region of the coordinate system comprising the bed may extend in the coordinate system above the bed by about 1 feet or more (e.g., about 2 feet or more, about 3 feet or more, about 4 feet or more, about 5 feet or more, etc.) and adjacent to the bed by 0.5 feet or less (e.g., about 0.25 feet or less, etc.).

Any of these methods may include identifying the first person and/or the second person based on a wearable sensor worn by the first person and/or the second person. Alternatively or additionally, any of these methods may include identifying the first person and/or the second person based on a patient identification associated with the bed and dwell time in the bed (e.g., the corresponding point cloud/person in the bed for the longest may be associated with that bed).

In any of these methods and apparatuses, triggering the assault alert may comprise one or more of: sending a text, sending an email, emitting an alarm. Triggering the assault alert may comprise triggering the alert to a healthcare worker. Triggering the assault alert may comprise triggering the assault alert when the first representative point or first set of points and the second representative point or second set of points are both within a predetermined distance from threshold of each other within the region of the coordinate system comprising the bed. The predetermined distance threshold may comprise 3 feet or less.

As mentioned, in any of these examples the radar system may comprise a millimeter wave radar system.

For example, a method of detecting an assault within a room of a healthcare facility may include: generating, using a millimeter wave radar system within the room, a point cloud derived from an image of the room, wherein the room includes a bed at a fixed location within a coordinate system corresponding to the room; determining, from the point cloud, a location of a representative first point or first set of points of the point cloud corresponding to a first person, wherein first set of points is identified based on relative movement of points within the point cloud; determining, from the point cloud, a location of a second representative point or second set of points of the point cloud corresponding to a second person, wherein second set of points is identified based on relative movement of points within the point cloud; triggering an assault alert when the first representative point or first set of points and the second representative point or second set of points are both within a predetermined distance threshold to the bed within the coordinate system for greater than a duration threshold.

Also described herein are systems configured to perform any of these methods. These systems may include software, firmware and/or hardware to perform any of these methods. For example, a system for detecting an assault within a room of a healthcare facility may include: a radar transducer; one or more processors comprising a non-transitory computer-readable storage medium including instructions that, when executed by one or more processors, cause the one or more processors to perform a method comprising: generating, using a radar system within the room, a point cloud derived from an image of the room, wherein the room includes a bed at a fixed location within a coordinate system corresponding to the room; determining, from the point cloud, a location of a representative first point or first set of points of the point cloud corresponding to a first person; determining, from the point cloud, a location of a second representative point or second set of points of the point cloud corresponding to a second person; and triggering an assault alert when the first representative point or first set of points and the second representative point or second set of points are both within a region of the coordinate system comprising the bed.

The system of claim 16, wherein determining the location of the representative first point or first set of points of the point cloud corresponding to the first person comprises determining a relative position of a first centroid of the first set of points, and wherein determining the location of the second representative point or second set of points of the point cloud corresponding to the second person comprises determining a relative position of a second centroid of the second set of points.

Also described herein are methods of detecting self-harm (including strangulation). For example, a method of detecting a patient in a healthcare facility is attempting to self-harm, the method comprising: generating, using a radar system within a room of the healthcare facility, a point cloud within a coordinate system corresponding to the room, including a region of a door of the room; identifying a representative point or set of points corresponding to the patient within the point cloud; and triggering an alert that the patient is attempting to asphyxiate themselves if the representative point or set of points corresponding to the patient is within an asphyxiation proximity threshold of the region of the door of the room for greater than an asphyxiation duration.

The region of the door may include the entire door, or in some cases just a region at a top and/or bottom of the door.

The region of the door may extend some door threshold amount from the door (e.g., within 3 inches, within 6 inches, within 1 foot, within 1.5 feet, within 2 feet, etc.).

Triggering the alert may comprise triggering the alert if the representative point or set of points corresponding to the patient is within the asphyxiation proximity threshold of the region of the door of the room for greater than the asphyxiation duration when the door is closed; thus any of these methods may include determining if the door is open or closed. Any of these methods (and apparatuses configured to perform them) may include monitoring the representative point or set of points corresponding to the patient relative to the region at the top and/or bottom of a door of the room. Any of these methods and apparatuses may include determining if the door is open or closed from the point cloud.

Triggering the alert may comprise triggering the alert to a healthcare worker.

In any of these methods and apparatuses, generating, using the radar system may comprise generating, using a millimeter wave radar system. Triggering the alert may comprise estimating a likelihood as that the patient is attempting to asphyxiate themselves as a function of a duration and proximity of the representative point or set of points corresponding to the patient to the region at the top and/or bottom of the door.

The region of the door (e.g., the region of the top and/or bottom of the door) may be predetermined into a coordinate system, and further identifying the representative point or set of points corresponding to the patient within the point cloud may comprise identifying the relative distance using the coordinate system. Any of these methods may include continuously monitoring the representative point or set of points corresponding to the patient with a monitoring frequency of between about 0.2 Hz and 100 Hz. The asphyxiation proximity threshold may be 1 foot or less. The asphyxiation duration may comprise about 20 seconds or more.

As mentioned above, also described herein are systems for performing any of the methods described herein. For example, a system for detecting a patient in a healthcare facility is attempting to self-harm, system comprising: a radar transducer; one or more processors comprising a non-transitory computer-readable storage medium including instructions that, when executed by one or more processors, cause the one or more processors to perform a method comprising: generating, using a radar system within a room of the healthcare facility, a point cloud within a coordinate system corresponding to the room, including a region of a door of the room; identifying a representative point or set of points corresponding to the patient within the point cloud; and triggering an alert that the patient is attempting to asphyxiate themselves if the representative point or set of points corresponding to the patient is within an asphyxiation proximity threshold of the region of the door of the room for greater than an asphyxiation duration.

A method of detecting strangulation within a patient's room may include: receiving or obtaining, from a transducer, a three-dimensional (3D) point cloud within a coordinate system corresponding to the patient's room; determining, based on the 3D point cloud, a location of a doorway in the patient's room; determining, based on the 3D point cloud, a current location of a patient; and sending a strangulation alert based on the current location of the patient and the location of the doorway.

The current location of the patient may be within a predetermined distance of the doorway. Any of these methods may include determining a dwell time that describes a time period when the patient is within a predetermined distance of the current location, wherein sending the strangulation alert is based on the dwell time exceeding a predetermined time period.

The methods described herein may include locating a ligature near the location of the doorway, wherein sending the strangulation alert is based on locating the ligature. The ligature may be located near the top or the bottom of the doorway. Any of these methods may include determining a door state within the doorway, wherein sending the strangulation alert is based on the door state, wherein the door state includes an open state and a closed state.

The methods described herein may include determining, from a wearable device worn by the patient, at least one vital sign of the patient, wherein sending the strangulation alert is based on the at least one vital sign of the patient. For example, any of these methods may include determining, from the point cloud, a significant change to movement of the patient indicative strangulation.

The strangulation alert may comprise a text message, an email, a software notification, or a combination thereof.

A system for detecting strangulation within a patient's room may include: a radar transducer; and one or more processors comprising a non-transitory computer-readable storage medium including instructions that, when executed by one or more processors, cause the one or more processors to perform a method comprising: receiving or obtaining, from the radar transducer, a three-dimensional (3D) point cloud within a coordinate system corresponding to the patient's room; determining, based on the 3D point cloud, a location of a doorway in the patient's room; determining, based on the 3D point cloud, a current location of a patient; and sending a strangulation alert based on the current location of the patient and the location of the doorway. The current location of the patient may be within a predetermined distance of the doorway.

Also described herein are method of detecting assault based on proximity and audio monitoring. In particular, any of these methods may include audio monitoring that is configured to maintain the privacy and anonymity of the people within the room being monitored. For example, described herein are methods of detecting assault within a patient's room in a healthcare setting, the method comprising: receiving or obtaining, from a radar transducer, a three-dimensional (3D) point cloud within a coordinate system corresponding to the patient's room; determining, based on the 3D point cloud, a location of a first person in the first room; determining, based on the 3D point cloud, a location of a second person in the first room; monitoring an audio signal within the room; identifying, from the audio monitoring, an audio signal indicating distress; and triggering an assault alert when a proximality between the location of the first person and the location of the second person is less than a proximity threshold and when the audio signal indicating distress has been identified.

Monitoring the audio signal within the room may comprise activating the monitoring of the audio signal when the first person is within a proximity threshold to the second person. Monitoring the audio signal within the room may comprise activating the monitoring of the audio signal when both the first person and the second person are within the room and identifying one or more key words or sounds that would be associated with assault or an assault precursor. Identifying the audio signal indicating distress may comprise using natural language processing with the audio monitoring to identify one or more verbal distress indicators. In some cases identifying the audio signal indicating distress comprises identifying audio signals that exceed a volume threshold. Monitoring the audio signal may comprise monitoring the audio using an amnesic audio monitor that does not store a persistent recording, or transmit the audio signal or transcriptions of the audio signal. For example, monitoring the audio signal may comprise capturing key words from the audio signal but not the intonation in playback form such that a person could be identified.

Any of these methods may include disengaging audio monitoring when the first person is outside of the proximity threshold relative to the second person.

Triggering the assault alert when the audio signal indicating distress is detected may further comprise triggering the assault alert when the audio signal indicating distress is detected and when a proximity event is detected between the first person and the second person based on the 3D point cloud. Any of these methods may include associating a first identification (ID) with the point cloud corresponding to the first person and associating a second identification (ID) with the point cloud corresponding to the second person.

Associating the first and second IDs may comprise referring to a wearable device worn by the first and/or second person. For example, associating the first and second IDs may comprise automatically associating the first and second IDs based on a proximity and dwell time to a bed within the first room.

Any of these methods may include monitoring proximity between the first person and the second person by: establishing, based on the 3D point cloud, a first monitoring zone associated with the first person; and determining that the location of the second person is within the first monitoring zone.

Triggering the assault alert may comprise sending a notification alert comprising a text message, an email, a software notification, or a combination thereof. The transducer may be a millimeter wave (mmWave) transducer, a lidar transducer, an ultrasound transducer, or a combination thereof.

For example, a method of detecting assault within a patient's room in a healthcare setting may include: receiving or obtaining, from a radar transducer, a three-dimensional (3D) point cloud within a coordinate system corresponding to the patient's room; determining, based on the 3D point cloud, a location of a first person in the first room; determining, based on the 3D point cloud, a location of a second person in the first room; engaging audio monitoring within the room when the first person is within a proximity threshold to the second person; identifying, from the audio monitoring, an audio signal indicating distress; and triggering an assault alert when the audio signal indicating distress is detected.

As mentioned, also described herein are systems for performing any of these methods. For example, a system for detecting an assault within a patient's room in a healthcare facility may include: a radar transducer; an audio monitor; and one or more processors comprising a non-transitory computer-readable storage medium including instructions that, when executed by one or more processors, cause the one or more processors to perform a method comprising: receiving or obtaining, from a radar transducer, a three-dimensional (3D) point cloud within a coordinate system corresponding to the patient's room; determining, based on the 3D point cloud, a location of a first person in the first room; determining, based on the 3D point cloud, a location of a second person in the first room; identifying, from the audio monitoring, an audio signal indicating distress; and triggering an assault alert when a proximity between the location of the first person and the location of the second person is less than a proximity threshold and when the audio signal indicating distress has been identified.

The one or more processors may be configured for identifying the audio signal indicating distress using natural language processing with the audio monitoring to identify verbal distress indicators. A verbal distress indicator may be a word or phrase that is associated with assault, including profanity, slurs, etc. The verbal distress indicator may include a tone, cadence and/or volume indicator. The verbal distress indicator may be shout, cry, scream, etc. For example, identifying the audio signal indicating distress may comprise identifying audio signals that exceed a volume threshold.

Any of these method and apparatuses may include the use of light levels to detect assault and/or self-harm. For example, described herein are methods and apparatuses for detecting assault within a patient's room in a healthcare setting comprising: receiving or obtaining, from a radar transducer, a three-dimensional (3D) point cloud within a coordinate system corresponding to the patient's room; determining, based on the 3D point cloud, a location of a first person in the first room; determining, based on the 3D point cloud, a location of a second person in the first room; determining a light intensity in the room; and triggering an assault alert when a proximality between the location of the first person and the location of the second person is less than a proximity threshold and when the light intensity is below an illumination threshold.

In any of these examples the illumination threshold may be, e.g., is 90 lux or less (e.g., 80 lux or less, 70 lux or less, 60 lux or less 50 lux or less, 40 lux or less, 30 lux or less, 20 lux or less, etc.).

The proximity threshold may be, e.g., 3 feet or less (2.5 feet or less, 2 feet or less, 1.5 feet or less, 1 feet or less, etc.).

Any of these methods may include associating a first identification (ID) with the point cloud corresponding to the first person and associating a second identification (ID) with the point cloud corresponding to the second person. For example, any of these methods may include associating the first and second IDs comprises referring to a wearable device worn by the first and/or second person. Associating the first and second IDs may comprise automatically associating the first and second IDs based on a proximity and dwell time to a bed within the first room.

Any of these methods may include monitoring proximity between the first person and the second person by: establishing, based on the 3D point cloud, a first monitoring zone associated with the first person; and determining that the location of the second person is within the first monitoring zone.

Triggering the assault alert mat comprises sending a notification alert comprising a text message, an email, a software notification, or a combination thereof.

The transducer may be a millimeter wave (mmWave) transducer, a lidar transducer, an ultrasound transducer, or a combination thereof.

Also described herein are systems configured to perform any of these methods. For example, a system for detecting an assault within a patient's room in a healthcare facility may include: a radar transducer; a light sensor; and one or more processors comprising a non-transitory computer-readable storage medium including instructions that, when executed by one or more processors, cause the one or more processors to perform a method comprising: receiving or obtaining, from a radar transducer, a three-dimensional (3D) point cloud within a coordinate system corresponding to the patient's room; determining, based on the 3D point cloud, a location of a first person in the first room; determining, based on the 3D point cloud, a location of a second person in the first room; determining a light intensity in the room from the light sensor; and triggering an assault alert when a proximity between the location of the first person and the location of the second person is less than a proximity threshold and when the light intensity is below an illumination threshold.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which.

DETAILED DESCRIPTION

Figure 1:
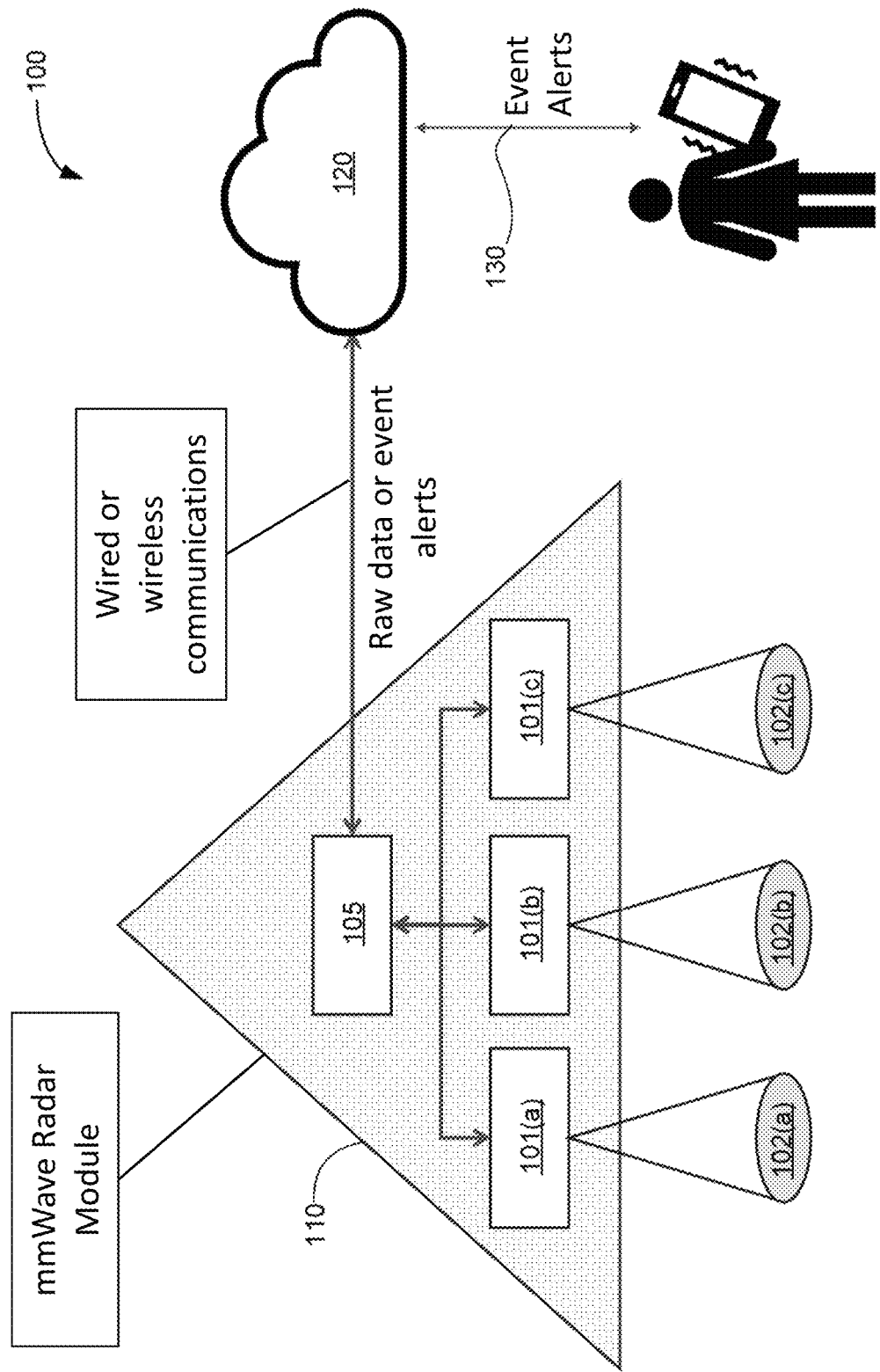
FIG. 1 is simplified block diagram of an example patient monitoring system.

Monitoring the location and/or activity of patients is often necessary to ensure their safety as well as the safety of other patients. This is particularly true when some patients are combative or depressed and may harm themselves or others around them. Furthermore, in some healthcare settings, many patients may share bedrooms (sleeping quarters) or may have access to other patients. Monitoring patient behavior within these bedrooms can be difficult while still providing privacy to the patients.

The present disclosure is related to methods and apparatuses, e.g., devices, systems, and the like, including software, e.g., computing device readable media, hardware and/or firmware, which solve technical problems related to monitoring patients, particularly within healthcare settings. In some examples, one or more transducers can be located within areas to be monitored. The transducers can generate a three-dimensional point cloud of a monitoring region that is analyzed to determine not only patient location, but also determine whether undesirable patient activity is occurring such as an assault (e.g., sexual or violent assault) or the like. In some implementations, 3D point cloud data can be analyzed to infer risk of dangerous or undesirable behaviors and/or interactions between patients and/or staff (e.g., healthcare professionals). In some cases the methods and apparatuses described herein may provide in-room radar or other 3D imaging systems (e.g., millimeter-wave, mmWave, radar) alone or in combination with patient location data determined through a patient worn device that may be tracked with one or more access points.

In general, any of the systems, devices, methods, etc. described herein can locate, track and monitor patient behavior and/or welfare. Based on the determined behavior and/or welfare, alerts can be sent to healthcare staff to take appropriate action. In some examples, a log file can be created that includes patient location tracking information as well as any related patient activities.

Healthcare settings may have a variety of problems that can be solved using the methods and apparatuses described herein, which can measure both distance and velocity to build 3D representations of objects and their movements within their aperture or field of view. In general, these methods and apparatuses may use one or more of: Lidar, millimeter wave (mmWave) radar, and/or ultrasound. Each of these has distinct advantages over cameras that work in the visual or infrared spectrum. Many areas within healthcare prohibit cameras due to privacy concerns. These 3D image technologies described herein can address problems that have heretofore not been addressed. The usefulness of these technologies can also be enhanced by incorporating them into patient monitoring systems that can identify patients as well as indicating their macro locations. The methods and apparatuses (systems, devices, etc.) described herein may measure both distance and velocity to build 3D representations of objects and their movements within their aperture or field of view. Lidar, millimeter wave (mmWave) radar, and ultrasound are three such technologies that may be included as part of the methods and apparatuses described herein. These techniques have distinct advantages over cameras that work in the visual or infrared spectrum. As mentioned, many areas within healthcare prohibit cameras due to privacy concerns; the methods and apparatuses described herein, which may monitor individual behavior in a manner that remains anonymous to the patient, can address problems that have heretofore not been possible to address satisfactorily. The usefulness of these methods and apparatuses can also be enhanced by incorporating them into patient monitoring systems that can identify patients as well as their general locations.

Assault is one such area in which the methods and apparatuses described herein may be particularly helpful. In psychiatric hospitals, substance treatment, and residential settings, assault between patients or patients and staff can be a significant and highly consequently problem. Besides trauma and injury, an assault can bring criminal liability, civil liability, and regulatory penalties that can cost millions of dollars as well as threaten a facility's licensure and ability to operate. Patients are often assigned to single, double or even triple occupancy rooms. In every case, there is a risk of sexual or violent assault. Even "consenting" sexual contact can generate costly consequences especially if the parties are below the age of consent or are otherwise under a protective regimen.

Thus, any of the methods and apparatuses described herein may detect a likelihood of assault. Assault can be detected as prohibited proximity between two or more people, e.g., within a particular distance threshold, within a prescribed location (e.g., another patient's bed) and/or for a detected time period. A prohibited proximity may include that which otherwise would not occur during normal workflow or activities within a healthcare facility. More specifically, prohibited proximity can be defined as follows: (1) two or more people co-located in the same bed regardless of posture (e.g., lying, standing, kneeling) for any length of time; (2) two or more people co-located in a predefined space or proximity such as the approximate width of a single bed (e.g., 38") regardless of posture (lying, standing, kneeling) for a length of time >=5 seconds. Thus, these methods and apparatus may compare the patient proximity, which may be detected as a confirmed (e.g., by secondary monitor) or unconfirmed point cloud, e.g., from a 3D imaging system, such as a mmWave radar system. The methods and apparatuses described herein may further classify prohibited proximity as "violent," e.g., being associated with rapid or relatively high frequency movement, and/or relatively high movement accelerations or decelerations by one or more people, or non-violent, e.g., below the threshold for frequency of movement and/or acceleration/deceleration of the point cloud or within the point cloud. For example, an assault (and in some cases, a violent) assault may be identified if any one or more of the people sensed have abnormal accelerations of all or some part of their body (e.g., arms, legs, etc.). The methods and apparatuses described herein may likewise determine if an assault is occurring if one or more of the two people have a change in posture such as both moving to a prone floor position or falling (changes in position may be detected by accelerometer and/or by monitoring the point cloud, e.g., by LIDAR, mmWave, etc.). The methods and apparatuses described herein may also or alternatively identify assault when one or more of the people express key words or sounds that have been shown to be associated with duress or some type of prohibited interaction.

In general, the methods and apparatuses may include a map of the surroundings (e.g., walls, furniture, doors, etc.) that may be generated by the radar system (e.g., mm Wave system, Lidar system, ultrasound system, etc.), and/or may be confirmed by the radar system. In some cases the map of the room(s) may be pre-entered and/or confirmed into the system. In addition, the thresholds and/or rules for proximity may be predetermined, modified and/or set by the user (e.g., caregivers, supervisor, etc.). These rules may be tied to the time of day (e.g., nighttime activity thresholds may be different than daytime activity thresholds).

Typically, preventing and detecting assault (prohibited proximity) in a fast and accurate way has proven difficult for a variety of reasons. Visible or infrared camera monitoring within bedrooms in healthcare facilities is typically prohibited for privacy reasons and expensive. Wireless location technologies, whether Bluetooth, ultra-wideband or other traditional RTLS technologies are not accurate enough even with extensive and expensive installation of sensors and locators. For example, in a psychiatric hospital, double occupancy beds might be spaced 3-4 feet apart. The size of a hospital room bathroom is also smaller than the accuracy of most macro location systems. Other technologies have also fallen short. For example, "laser curtains" can be fixtured around a bed to detect when the beam is broken. However, these systems cannot discriminate whether the beam is broken due to a patient getting into or out of bed or whether a second patient is entering a bed, or simply wandered into the "curtain" momentarily. As such, these systems will inherently have lots of false positives. Every time the beam is broken is not necessarily due to an assault; it could simply be a patient getting into or out of bed.

The methods and apparatuses described herein may be implemented without the need for complex systems requiring multiple sensor types. Complex systems that combine multiple sensor heads and/or in which each sensor head consists of multiple sensor types, e.g., camera sensors (RGB, Depth and Thermal), audio sensors, radar sensors and dynamic visions sensors (DVS or "Event" cameras), etc. have also been built to detect assault or self-harm especially in prison settings. However, such systems are very expensive and unnecessarily complex, and also require significant processing power to analyze the various data streams and fuse them into a single result. For example, such systems may require up to 6 data streams per sensor head multiplied times the number of sensor heads (2-3) or 12-18 data streams in total compared to a single or dual data stream for the system described herein, which is capable of performing faster and requiring less processing power. Handling multiple data streams dramatically increases the cost of these more complex systems as compared to a single or dual stream system. In an institution such as a hospital that might have several hundred beds, the expense associated with excess data streams would make such a system out of reach for most hospitals. The methods and apparatuses described herein may use a significantly lower sensor complexity and sensor density, e.g., less than 1 or 2 sensors per 100 square feet or less (e.g., 150 ft$^2$, 200 ft$^2$, 250 ft$^2$, 300 ft$^2$, 250 ft$^2$, 300 ft$^2$, 400 ft$^2$, 500 ft$^2$, etc. or less).

In some cases, the mmWave radar systems described herein need only one sensor head per small room and/or one or two sensors per sensor head to detect a range of self-harm and assault events between two or more people. A typical psychiatric hospital room is nine by thirteen feet. For the example apparatuses described herein, a radar sensor having an aperture of 120° and the room height is nine feet, the sensor can cover the entire room to a height greater than five feet.

In addition, the methods and apparatuses described herein are significantly more flexible and more successful at estimating relevant events, such as assaults and the like. For example, described herein are methods that may include the use of one or more mmWave radar System-on-Chips (SOC) components that are capable of a wide field of view necessary to see two or more beds simultaneously in a multi-occupancy psychiatric hospital room as well as the surrounding area. These radar SOC's typically have one or more transmitters and receivers to aid in spatial resolution and area of coverage among other things. The methods and apparatuses described herein, which may include these chips, can interrogate a room from above or on a wall, continuously and can detect the location, distance, velocity, presence, and some physiological information of a patient in a bed or room as well as the movement of patients in or out of beds including co-occurring in one bed or otherwise prohibited proximity. Similarly, these methods and apparatuses can detect the presence of another person entering the room and subsequently entering a bed occupied by a patient. By its nature, a mmWave radar system would have close to 100% accuracy with very low latency. Very high accuracy is critical to prevent false positives or false negatives which can create alarm fatigue and erode confidence in a system. As described herein, mmWave radar can detect a person even if they are lying still due to its ability to detect submillimeter movement such as from breathing. It can also detect a person whether they have a locator tag (necessary for most other technologies) which is advantageous for detecting someone that ordinarily wouldn't be wearing a locator tag but can commit an assault such as a staff person.

In some examples the methods and apparatuses described herein may use a Frequency modulated continuous wave (FMCW) radar configuration that can detect distance as well as movement. The radar, e.g., mmWave radar, may transmit a high-frequency signal (e.g., of around 60 GHZ) whose frequency increases linearly over time, creating a "chirp" signal. The transmitted signal(s) get reflected off objects in its path. The reflected signal(s) are then mixed with the transmitted signal(s) to produce a lower intermediate frequency signal. The frequency difference between the transmitted and reflected signals may be directly proportional to the time delay between them, which corresponds to the distance to the target object. By measuring this frequency difference, the radar system (sub-system) can calculate the precise distance to the target.

In any of these methods and apparatuses, micro-motions (e.g., submillimeter movements, such as breathing, heart rate) or larger motions are detected the same way except that a signal reflecting off a moving target may be frequency shifted due to the Doppler effect. The shift is proportional to the target's radial velocity (speed towards or away from the radar). Thus, as mentioned, the radar sub-system could be used to build a 3D representation of a room thereby showing beds as well as their relative position. Such a radar system could also detect when a patient enters or exits a room or bed as well as whether they are in the bed. Such radars can also provide information on the patient's position in bed such as whether they are lying flat, sitting up, or at the edge of the bed and subsequently standing. A patient's subsequent movement to another bed or other part of the room can also be detected as well as two patients co-located in one bed. Such a system could simultaneously monitor the status of multiple people for a variety of purposes including assault.

In general, patient movement may be detected as part of a point cloud that has dynamic properties indicating both gross movement(s) of the patient relative to the environment (room, other patient's, etc.) and/or movements of the patient's extremities relative to the patient themselves (e.g., arms, legs, head, etc.). The apparatuses described herein may continuously monitor for the presence of multiple people simultaneously within a room as well as changes such as their movements, co-location, posture (prone, sitting, sitting up, standing), etc. and relative position with the space (on the floor, on the furniture, etc.). The radar can be used to create and constantly update one or more 3D point clouds that can be referenced to physical dimensions via a map or set of coordinates. A radar sensor may precisely measure the absolute distance, in three dimensions between objects in its field of view reflective to itself. When the radar sensor's position is referenced to a physical map, an object's distance and motions can be precisely associated with the floor map.

For example, a person is constantly in motion and the radar-determined cloud of moving points can be used to model a person. Each person may be referred to as a separate point cloud. The system may identify individual point clouds within the overall space being monitored. The centroid of a person's point cloud can be used to set proximity thresholds. When the distance between the centroids of two or more patient point clouds falls below a proximity threshold, an alert can be generated. For example, alerts could be sent if one roommate enters the bed of another patient or if a third person enters the room and enters the bed of a patient. Alerts could also warn of possible precursors to an assault such as whether a patient is out of bed, or a third person has entered the room. There are a variety of techniques that could be used to trigger alerts to users for pre-defined events. For example, radar could continuously track the movements of patients and their surroundings (e.g., beds) and send alerts using pre-defined rules or thresholds such as when a patient is out of bed or hits a monitoring zone around another patient's bed or generates a large movement mass associated with two co-located patients. Dwell time thresholds could prevent non-event alerts. The level or characterized nature of detected activity (e.g., rapid movement, high accelerations) could also be a threshold for alerting. As mentioned, the time of day may also be used to set or adjust the threshold(s).

Any of these methods and apparatuses may also include one or more additional patient and/or caregiver wearable sensor that may be used by the system. For example, the patient(s) may wear a sensors device (e.g., wearable) that monitor and transmit the acceleration of their body or limbs accelerations. Thresholds can be set that would further characterize the type of potential assault (prohibited proximity). A central system CPU collecting and interrogating information from radar sensors and patient wearables, would allow threshold and alerting logic to more fully characterize prohibited proximities. Thus, in some cases the use of wearable sensor(s) in addition to the radar system may provide additional confirmation and/or data stream that may be used to confirm patient identity, screen for prohibited activity, etc.

Any of the methods and apparatuses described herein may also be configured to automatically determine an identifier with a patient within a room, e.g., based on the patient ID assigned to a bed in the room. For example a system as described herein may continuously monitor for the presence of patients in the beds, once a patient enters a bed, you could assign the patient ID assigned to that bed to that body model and then tag that body model with that patient ID. For example, in a room having two beds, the room and beds may be assigned to the patients assigned to that room. Therefore, when a body model enters a bed in the evening, the apparatus or method may label that body model with the patient ID assigned to that bed. Subsequently, the method or apparatus may associate that label with that body model regardless of where they go within the room.

Any of these methods and apparatuses may include a radar system combined with a macro-location system that identifies specific patient locations and movements outside of radar range. The two sub-systems could be combined via software and central processor (e.g., CPU) to generate accurate alerts if predetermined parameters are met, such as if a patient is headed into a bedroom that is not their own, thereby, preventing a possible assault. For example, if patients are wearing a tag or wearable whose ID is linked to the patients ID and generates and relays information about the patient's location and movements, the system may be configured to send users (e.g., caregivers) one or more alerts about conditions that might be precursors to an assault (e.g., prohibited proximity). For example, at night in many healthcare settings such as psychiatric hospitals, patients have assigned rooms and beds and are not permitted to be in hallways past bedtime and certainly are not allowed to enter another patient's room. Being able to identify a specific patient entering a bedroom that is not their own where a subsequent assault takes place (they could be seen entering the room as well as co-locating with another patient), identifies who the assailant is. Combining and persisting both the radar and macro location and movement history may be helpful to establish the validity and seriousness of claims-especially important when the consequences of assaults can have grave financial and regulatory impacts.

If a patient's wearable tag has sensors that broadcast information about the patient's activity or physiologic parameters, the nature of an assault could be determined as well. For example, vigorous activity with high acceleration spikes might indicate that a violent assault is underway and the absence of such spikes, but the presence of increased heart rate or respiration might suggest a sexual encounter.

Any of the apparatuses and methods described herein may be configured to prevent and detect strangulations and other self-harm events by combining the radar sensor with a microphone. For example, a microphone may be configured to capture words and sounds that correlate to desired event detection. The system may digitally capture the sounds and analyze them, e.g., using Natural Language Processing (NLP) models, and/or by identifying (volume, intensity, etc.) sounds associated with distress to determine if an adverse event is in progress or is a possible precursor to such an event. These apparatuses may include one or more processors (e.g., a CPU) to analyze event status by combining the radar and audio (e.g., NLP or other identification module) outputs to increase the probability of detecting event precursors and real-time events. Such combined outputs provide refined characterization of the type of event better than either technology alone could. The apparatus and method may be configured so that the actual sounds are not available for human playback for privacy reasons. For example, the sounds may be processed to identify indicators of distress without converting or storing either the original sounds or human language transcriptions.

Radar and microphone sensors would also be very effective in detecting sleep apnea in patients. As discussed, radar has the ability to detect respiration and other biometric movements. A microphone could collect sounds that have a very distinct signature associated with sleep apnea. A central processor could combine and simultaneously analyze both types of sensor input for a more accurate determination of sleep apnea than either sensor could provide alone.

The methods and apparatuses described herein may also be configured to detect or determine one or more signs of life. Patients in healthcare settings may experience rapid declines in their health that result in death or serious harm. In many settings, patients are not connected to traditional medical monitoring equipment on a continuous basis, so it can be difficult to detect and intervene when patients rapidly decompensate or expire, especially when in bed. In behavioral health settings, patients at higher risk of death and injury are the elderly, those with co-occurring conditions, those under substance detox treatment, and those at risk of self-harm and suicide. Periodic caregiver rounding at night is typically insufficient to catch a patient decompensating due to the infrequency of rounds, lack of compliance or inattention to the patient's vitals (e.g., respiration). Wearables that incorporate biometric sensors can alert when a patient expires or may be in decline. However, a patient decompensating or otherwise in distress might be missed by a wearable or generate false positives. Radar, especially if combined with a biometric wearable, can provide a greater assurance of catching a patient in decline. mmWave radar can detect sub-mm patient movements from respiration as well as subtle body movements that might be missed by a wearable on the wrist. Patients undergoing detox or self-asphyxiation can experience seizures that affect the whole body. Radar is well suited to recognize and alert to these conditions. Detecting seizures in a patient in bed using just a wearable is inherently more difficult since the wearable can primarily sense seizure movement affecting the arm it is worn on and these may be damped by bedding. In some cases, combining a wearable with radar can provide the patient's ID along with heart rate as well as movements associated with breathing and seizures thereby providing a more reliable system to alert for serious patient decline or death.

In general, these methods and apparatuses may be configured to detect (in order to help avoid) patient self-harm, e.g., due to strangulation. For example, a radar (e.g., mm Wave radar) system as described herein may be used in a psychiatric hospital setting and may be configured to detect hanging or strangulation on the back of a bedroom or bathroom door. Most self-harm and suicides in psychiatric hospitals occur in bedrooms or bathrooms. Patients will jam sheets or clothing into the top or bottom of a door and use the free end to strangle themselves. Since video systems are not typically allowed in these areas due to privacy concerns, and since such systems would be very expensive to monitor routinely for every patient a better solution is needed. The methods and apparatuses described herein may be configured to detect this type of event. Alternatively, commercially available systems may use pressure, laser or mass sensors to detect something around the top of the door or adding mass to the door. These systems tend to be expensive, disruptive to install and associated with false positives, since anytime someone puts their hands on top of door an alert will generate. These systems are also very visible so patients can trigger them intentionally or attempt self-harm in some other way. Most of these systems also do not sense if something has been wedged at the bottom of door. Patients have been known to wedge a sheet or clothing under the door and then "alligator roll" on the floor to asphyxiate themselves.

In some examples, the radar sub-system could direct radar to be aimed at the back of a door as well as its surrounding wall and floor area to detect strangulation events. Such a system may be comparatively inexpensive, highly accurate and have a very low latency (less than a few minutes) and could detect virtually every type of strangulation event.

Because radar can detect both distance and movement, the methods and apparatuses described herein may include an algorithm to alert for possible strangulation conditions. The system may use radar to determine that the entry door is closed, and may check for the presence of a person at a certain proximity to the door. If the patient exceeds a certain time duration in that position an alert may be sent. The presence of a ligature from the top of the door in conjunction with the patient's position may also trigger an alert. The "alligator roll" scenario is where the patient self-strangulates using some type of ligature from the bottom of the door could be detected in a similar fashion except that the system would also look for the patient at or near the floor. Patient distress or a lack of movement (e.g. breathing) may also generate an alert. A patient-wearable device (e.g., patient wearable) may be used in conjunction with the radar subsystem, and may improve overall efficacy of system, e.g., by alerting on biometric readings such as heartrate. Bathrooms are often located in the short hallway leading to the exit door. Such a system could easily distinguish between a patient transiting to or from the bathroom and strangulation at the exit door.

Bed Monitoring

Any of the apparatuses (systems, devices, etc.) described herein may be configured to identify one or more "beds" within the room and to infer assault based on the colocalization of more than one person on or near the bed.

The bed may be in a predetermined location within the coordinates of the room. This may be particularly true in hospitals or patient institutions (wards, etc.) in which furniture, and in particular beds, may be secured to a known/predetermined position within the room. The bed(s) may be in a stereotyped location and/or the location may be entered into the mapping of the room or room volume accessible to the apparatus. In general the methods and apparatuses may monitor patient location (e.g., point cloud location) relative to coordinates for the room, which may include regions within the coordinates (coordinate system) corresponding to beds, ingress/egress (e.g., doors, windows, etc.), other furniture or the like. Any of these apparatuses and methods may set (e.g., initialize) the coordinate system and may confirm/update it periodically. In some cases the bed location/position within the room (e.g., within psychiatric units, prisons, etc.) may be fixed. In some cases the bed location/position may be dynamic and may be detected and/or confirmed in an ongoing manner. For example, the system may identify a bed location based on more markings present on the bed and/or bedding.

In some cases the bed may be pre-identified (including pre-set) within the coordinates for the point cloud monitoring, e.g., by the radar system. Alternatively or additionally, the bed may be identified (initially or periodically) by the radar system, which may detect the bed by identifying it from the radar signals (e.g., a point cloud). Thus, as the radar system tracks one or more persons (e.g., patients) within the room, the apparatus may infer relative position between the person(s) and the surface of the bed. The bed (e.g., bed region) may be identified within the room.

Identification of the bed as a subregion within the room (within a point cloud or other 3D model of the room being monitored, e.g., by the radar system) may provide a reliable and simplified technique to identify assault. Most assaults take place on or adjacent to a bed, and therefore an alert indicating a potential or actual assault may be triggered by detecting when two or more people are on (or within a proximate region, e.g., 3 feet or less, 2 feet or less, 1.5 feet or less, 1 foot or less, etc.) of a bed for greater than a threshold time (e.g., 30 seconds, 1 minute, 1.5 minute, 2 minutes, 3 minutes, 5 minutes, etc.). In particular, two people within the room should never be on the same bed, as such co-location therefore indicates assault or otherwise prohibited interaction within a hospital.

Duration

In general, any of the methods and apparatuses described herein may be configured to track duration as well as relative proximity and all or a portion of a point cloud comprising part of a person or part of different people. Thus, any of these apparatuses and methods may determine a duration of proximity and compare it to a threshold in order to determine an assault or self-harm event. In addition, any of the methods and apparatuses described herein may be configured to detect or determine velocities, and/or in some variations, velocity vectors. For example, any of the methods and apparatuses described herein may be configured to determine velocities of all or a portion of a person (e.g., as a subset of a point cloud corresponding to a part of the person) relative to other parts of the same person and/or a part of another object or person (e.g., based on a point cloud corresponding to the person, other person or other object). Thus, any of these apparatuses and methods may determine a duration of proximity and compare it to a threshold in order to determine an assault or self-harm event. Further, any of these methods or apparatuses may determine a change in velocity (e.g., an acceleration) of an object or part of an object (e.g., a person's arm(s), leg(s), hand(s), feet, etc.) and/or may compare the change in velocity (positive or negative acceleration) to a threshold to determine a likely assault.

Light Detection

Any of the method and apparatuses described herein may use one or more light sensors to determine if the room is light or dark. For example if the room is relatively dark (e.g., dark or under low-light conditions) then it may be more likely that contact between persons within the room is an assault. Thus, any of the methods and apparatuses described herein may adjust the threshold (e.g., threshold distance) for determining an assault between patients based on the intensity of the light within the room. If a light (e.g., room light) is not on, the apparatus or method may apply a low-light threshold that is more sensitive (e.g., has a greater value) than the lighted threshold. For example, a system or method may trigger an assault alert if the proximity between a first person and a second person, which may be determined by the radar system (e.g., point cloud analysis) is about x or less (e.g., 6 inches or less, 1 foot or less, 1.5 feet or less, 2 feet or less, 2.5 feet or less, 3 feet or less, etc.) while the room is illuminated by a light (e.g., overhead light, etc.), the system may trigger an assault alert if the proximity between a first person and a second person is about y or less (e.g., 2 feet or less, 2.5 feet or less, 3 feet or less, 3.5 feet or less, etc.) while the room is not fully illuminated (e.g., is dark or lit to a low level.).

Any appropriate light sensor may be used, and may be included with the radar system, as part of the same sensor component, or as a separate sensor component. For example, the light sensor may be a photodiode, phototransistor, photovoltaic cell, photoresistor, charge coupled device, CMOS sensor, etc.

Body Position

Any of these methods and apparatuses may be configured to detect or determine if a person detected by the radar system is lying down (e.g., recumbent) or standing, including while moving. In some cases, the method may determine if one or more persons within the room are lying on the floor; if two or more persons are lying on the floor in close proximity, e.g., in contact or having a center of mass within a threshold distance (e.g., within about 6 inches, 1 foot, 1.5 feet, 2 feet, 3 feet, 4 feet, 5 feet, etc.) this may trigger an assault alert.

For example, the methods and apparatuses described herein may use the radar system and my incorporate range, Doppler, and/or angle of arrival (AoA) information to generate the 3D point cloud, as described above, within the context of the coordinate system corresponding to the room to determine the posture of the subject(s) in the room. The apparatus and method may use the location and/or proximity to the bed as part of this analysis. Thus, the point cloud may be used to determine the spatial distribution of the body parts and therefore the posture. For example, the methods and apparatuses may estimate the body pose (pose estimation) by clustering and segmentation of the point cloud(s) within the room. The point cloud may be processed to group points that belong to the same body part. For example, a trained machine learning agent (e.g., machine learning algorithm) or heuristic may be used to segment the point cloud into different individuals and/or into clusters representing the head, arms, legs, and torso of the individual. In some cases the methods or apparatuses may analyze the segmented data to fit a skeletal model to the point cloud. This model may define the position of joints (e.g., elbows, knees) and limbs, allowing the apparatus or method to estimate the posture of the person (e.g., standing, sitting, lying down). Based on this skeletal model, the method or apparatus can determine the overall body position and orientation, such as whether the person is lying/sitting down, etc.

Alternatively, the system may quickly and with reasonable accuracy determine if the person is sitting or lying a bed based on proximity to the (known) bed position within the coordinates of the room, as described above. The apparatus may determine an approximate centroid of the person.

Anonymity

In general, any of the methods and apparatuses described herein may be configured to maintain the privacy and/or anonymity of the people (e.g., patients) in the room, even while using the radar, and/or audio monitoring. For example, the radar systems may describe/display any of the bodies within the rooms as body models. These body models may lack specific distinguishing features in order to maintain privacy, however, an identification code (ID) may be associated with each body model and therefore each patient in the room. The ID code may be an alphanumeric sequence that is associated with a particular person (patient, caregiver, visitor, etc.) but may require a key (e.g., reference) to decode. The ID code may be manually or automatically associated with each person (e.g., each body model and corresponding point cloud) within the room or rooms. For example, the ID code may be associated with a bed, corresponding to the bed on which each person (e.g., patient) is assigned. A body model lying in the bed may be assigned to the ID code associated with that bed. Other body models entering the room may be assigned to other ID codes. For example, the methods and apparatuses described herein may use bed assignments to tag people within the room once they get into a bed. Thus, bed assignments, which may be part of a patient's electronic health record (EHR) and the apparatus may assume that the person that gets into the bed is the assigned person for that bed. Thus, the apparatus may tag that person's point cloud accordingly.

In any of these examples, individuals may wear or hold a transmitter device that uniquely identifies that person. For example, a patient may include a wearable device that transmits a code associated with that patient. The apparatuses described herein may detect the ID code from the wearable device and may associate it with the body model (e.g., person point cloud) within the room.

As will be described in greater detail herein, any of these methods and apparatuses may incorporate an audio detection and/or monitoring sub-system, including one or more microphones that may assist in monitoring the room and identifying assault and/or self-harm. The apparatus may include one or more microphones and algorithms (e.g., software, hardware and/or firmware) to analyze the signals to determine if any of the people in the room are making sounds indicative of assault. This may include identifying shouting, yelling, screaming, crying, etc. (e.g., sudden change in volume) which may be correlated with proximity to another patient. In some cases the audio signal(s) may be analyzed to interpret speech, e.g., using a natural language processing/processor, that may determine if one or more persons is using language indicative of assault. Key words that may indicate assault may be identified. When language/sounds indicative of assault is used in combination with proximity to another patient, an assault alert may be triggered.

In some cases the apparatus may be configured to maintain privacy by analyzing, in an ongoing matter, the sound(s) within the room not recording, transmitting or storing the sound(s), and instead only analyzing them as they are uttered/made. In some cases the apparatus and/or method may be configured to activate the audio detection and/or analysis only when two or more people are in sufficiently close proximity to each other, in order to disambiguate assault. For example, if the radar indicates that the two or more people in the room are within a threshold distance (e.g., within about 1 feet, 1.5 feet, 2 feet, 3 feet, 4 feet, etc.) or each other.

Also described herein are apparatuses, including systems, that combine multiple room-level radar detection systems with a facility level (e.g. unit level) macro location detection system in which patients wear wearables that facilitate patient identification and location. These combined systems may include any of the features and/or components described herein and may include a variety of sub-systems for monitoring and tracking patients, and for identifying assault and/or self-harm. For example, an apparatus may be configured so that, precursor-to-assault alert can be made if a patient enters a room that they are not assigned to, by identifying the patient based on a wearable device, and tagging the body model correlated with the patient that is detected by a radar within the room with the ID from the wearable. In some examples, these methods and apparatuses may combine multiple radar sensing units into a single module where each unit can be configured to address a different problem. The units could be modular in one physical package or be a "hub" which has a single backhaul (e.g., ethernet, wireless, etc.) and each of the respective radar units may branch off for positioning around the room with power delivered from the hub. Any of these apparatuses may include a combination of radar and audio monitoring (e.g., sound analysis to detect assault, as described above).

Any of these apparatuses may include an integrated radar sub-system and a patient monitoring system (PMS). The PMS or software be considered to send alerts (text, email, software applications, etc.) to staff regarding one of the radar events (e.g., detection of assault) that associate events with specific patients and/or rooms. The patient monitoring system may be configured to determine and/or track patients based on wearables and/or beacons within the setting that may facilitate macro location detection and tracking. Any of these patient monitoring systems may include beacons and/or wearables that may facilitate real-time compliance with proximity based care interactions between staff and patients especially with scheduled intervals of care. Any of these apparatuses may include the use of a PMS with patient location to determine what specific patients are in a room where radar sensing is being used as in general a radar system may not be able to readily identify the identity of patients detected. Any of these apparatuses may use a macro location technique to emit an alert when a person (e.g., patient) entering or leaving a room is likely to indicate a precursor to an assault or subsequent fleeing of an assault.

In addition to triggering one or more alerts, any of these apparatuses may be configured to store and/or transmit evidence of the assault/likely assault. This evidence may be collected, stored and/or transmitted in a manner that maintains the confidentiality of the persons being monitored (e.g., in a healthcare system). For example the methods and apparatuses may record the identification no (ID) but not directly indicate the name/identity of the person, which may require as separate and independent step to decode which ID not corresponds to a particular person. Thus, any of these methods and apparatuses may store patient macro location data as well as radar signatures and events that precede and follow radar-based events; such data may be very helpful as evidence of how an event occurs and who was involved.

System Configuration

One advantage of the use of radar in the methods and apparatuses described herein is the penetration of the signal (mmWave signal) through relatively thin materials, such as plastic or drywall and remain effective; it can also operate in complete darkness. This allows a radar sub-assembly to be placed behind a wall and/or painted aperture which renders the device invisible to a patient (e.g., hidden). Hiding the system from the patient may reduce the potential for tampering or avoidance; and may provide a distinct advantage over something that requires visible line of sight such as a camera.

Any of these systems and apparatuses may include multiple radar sensors that may be used in a single space, such as a hospital room, to monitor multiple safety concerns. It may be advantageous to combine those sensors via a single processor (e.g., CPU) and/or communications backhaul and/or power source. In some cases these components may be part of a series of sensors that are addressed discreetly. For example, a system may include one sensor each to address assault, strangulation, and bathroom monitoring. Advantageously, these methods and apparatuses may instead have a single communication, power, CPU, and/or physical package that may significantly reduce the costs of materials, and installation. Device management may also be simplified. Multiple sensors may be combined in the same physical package or as a hub and umbilical cables to individual sensors such that a single communication backhaul to a central computer, whether wired or wireless, and power are maintained.

The transducers described herein may be capable of a wide field of view necessary to see two or more beds simultaneously in a multi-occupancy room as well as the surrounding area. Some transducers can scan a room (from above or on a wall) continuously and detect the location, distance, velocity, presence, and some physiological information of a patient in a bed or room as well as the movement of patients in or out of beds including co-occurring in one bed. Similarly, these apparatuses can be configured to detect the presence of another person entering the room and subsequently entering a bed occupied by a patient. By its nature, such a transducer may have close of 100% accuracy with very low latency. Very high accuracy is critical to prevent false positives or false negatives which can create alarm fatigue and erode confidence in a system. In some examples, a transducer can detect a person even if they are lying still due to its ability to detect submillimeter movement such as from breathing. Some transducers can also determine whether a person has a locator tag (e.g., a patient-worn device) which is advantageous for detecting someone that ordinarily would not be wearing a locator tag but can commit an assault such as a staff person.

Some transducers, such as Frequency modulated continuous wave (FMCW) radar transducers, can detect distance as well as movement. Therefore, the transducer could be used to build a 3D representation (3D point cloud) of a room thereby showing beds as well as their relative position. Such a system could also detect when a patient enters or exits a room or bed as well as whether they are in the bed. Such transducers can also provide information on the patient's position in bed such as whether they are lying flat, sitting up, or at the edge of the bed and subsequently standing. A patient's subsequent movement to another bed or another part of the room can also be detected as well as two patients co-located in one bed. Such a system could simultaneously monitor the status of multiple people for a variety of purposes including assault.

In some examples, a monitoring system could continuously monitor for the presence of multiple people simultaneously within a room as well as changes such as their movements, co-location, etc. The monitoring system can be used to create a 3D point cloud that can be referenced to physical dimensions via a map or set of coordinates. An algorithm could be configured to send a variety of notification alerts depending on user preferences. In general, an alert may refer to any feasible email, text message, software notification, or the like that can be delivered to any monitoring personnel. For example, notification alerts could be sent if one roommate enters the bed of another patient or if a third person enters the room and enters the bed of a patient. Notification alerts could also warn of possible precursors to an assault such as whether a patient is out of bed or a third person has entered the room. There are a variety of techniques that could be used to trigger and send notification alerts to users for pre-defined events. For example, the monitoring system could continuously track the movements of patients and their surroundings (e.g., beds) and send notification alerts using pre-defined rules or thresholds such as when a patient is out of bed or hits a monitoring zone around another patient's bed or generates a large movement mass associated with two co-located patients. Dwell time thresholds could prevent non-event alerts. The level or characterized nature of detected activity (e.g., rapid movement) could also be a threshold for alerting.

When such a monitoring system is combined with a macro-location system that identifies specific patient locations and movements outside of transducer range, the two systems could be combined via software to generate accurate alerts when a patient is headed into a bedroom that is not their own, thereby, preventing a possible assault. For example, if patients are wearing some type of tag whose ID is linked to the patients ID and generates and relays information about the patient's location and movements, the system could send notification alerts about conditions that might be precursors to an assault. For example, at night in many healthcare settings such as psychiatric hospitals, patients have assigned rooms and beds and are not permitted to be in hallways past bedtime and certainly are not allowed to enter another patient's room. Being able to identify a specific patient entering a bedroom that is not their own where a subsequent assault takes place (they could be seen entering the room as well as co-locating with another patient), identifies who the assailant is. Combining and persisting both the radar and macro location and movement history, would be critically important to establishing the validity and seriousness of claims. If the patient's wearable tag has sensors that broadcast information about the patient's activity or physiologic parameters, the nature of an assault could be determined as well. For example, vigorous activity with high acceleration or velocity spikes might indicate that a violent assault is underway and the absence of such spikes, but the presence of increased heart rate or respiration might suggest a sexual encounter.

FIG. 1 is simplified block diagram of an example monitoring system 100. The monitoring system 100 may include a transducer module 110 and a central processor 120. Although only one transducer module 110 is shown, in other examples, the monitoring system 100 can include any number of transducer modules. The transducer module 110 can include a number of transducers. In the example of FIG. 1, the transducer module 110 includes transducer 101(a), transducer 101(b), transducer 101(c), and a processor 105. Although only three transducers 101(a)-101(c) are shown, in other examples, the transducer module 110 can include any number of transducers.

The transducers 101(a)-101(c) can generate a three-dimensional (3D) point cloud of an area to be monitored. In general the transducers 101(a)-101(c) can have a wide field of view, a high-degree of accuracy, and very low latency. In some examples, the transducers 101(a)-101(c) can be millimeter wave (mmWave) radar transducers, however other transducers are possible. For example, the transducers 101(a)-101(c) can also be implemented with lidar transducers, frequency modulated continuous wave (FMCW) radar transducers, ultrasound transducers, or the like.

As shown, transducer 101(a) monitors region 102(a), transducer 101(b) monitors region 102(b), and transducer 101(c) monitors region 102(c). In some examples, the regions 102(a)-102(c) can overlap. In some examples, the 3D point cloud may include combined image data from the transducers 101(a)-101(c). In this manner an expanded monitoring region can be achieved through the use of multiple transducers.

The transducers 101(a)-101(c) are coupled to the processor 105. In some cases, the processor 105 can assist the transducers 101(a)-101(c) in generating 3D point clouds of any monitoring region. In some examples, the processor 105 can generate notification alerts based on the 3D point clouds. In general, the 3D point clouds are high resolution (millimeter and sub-millimeter accurate), low latency images. The 3D point clouds can be used to locate and identify any feasible items within a monitoring region. For example, the transducer 101(a) can locate and identify people and/or items (desks, beds, doors, and doorways for example within a region 102(a). Because of the accuracy and speed of the transducers 101(a)-101(c), the 3D point clouds can be used to detect certain vital signs of persons within the regions 102(a)-102(c). Example vital signs include respiration rates, body temperature, and the like.

The processor 105 can communicate with the central processor 120. In some examples, the processor 105 can transmit raw transducer data or 3D point cloud data to the central processor 120. In some other examples, the processor 105 can transmit notification alerts generated by any connected transducer to the central processor 120. The central processor 120 can be any remote (with respect to any coupled transducer) processing device. In some examples, the central processor 120 can receive data from the transducers 101(a)-101(c) and generate a 3D point cloud for regions 102(a)-102(c). In some examples, the central processor 120 can analyze 3D point clouds to locate persons or patients, identify environmental objects (beds, doorways, bathrooms) and the like. The central processor 120 can also send out notification alerts 130 to monitoring personnel. The notification alerts can be sent when one or more triggers or events have been detected. In some cases, the notification alerts can alert personnel to unwanted physical interactions (physical contact) between people, or the unexpected (or unpermitted) presence of people in a particular area.

Communication between the processor 105 and the central processor 120 can be through any feasible wired or wireless connection. Thus, communications can be performed through wired ethernet connections and/or wireless communication protocols including Wi-Fi (IEEE 802.11 based) protocols, Bluetooth, LTE, IoT, and the like.

The transducer module 110 can be relatively small and compact. In some examples, the transducer module 110 can have a relatively low profile and can easily be mounted on a wall or ceiling in or near an area to be monitored. In some cases, the transducer module 110 can easily be camouflaged, and in some cases painted to match wall or ceiling colors. In this way, the transducer module 110 may escape tampering or vandalism when installed in patient rooms, particularly in a healthcare setting. In some examples, the transducer module 110 may be battery powered, mains powered, or powered through a power-over-ethernet (POE) connection.

In some examples, transducer waves can penetrate objects such as plastic or even drywall and remain effective. This enables the transducer module 110 to be hidden behind a wall or painted aperture which renders the transducer module 110 invisible to a patient. Such a hidden transducer module 110 may reduce the potential for tampering or avoidance; a distinct advantage over other devices that require a visible line of sight, such as a camera.

When a need exists to have multiple transducers in a single space such as a hospital room to monitor multiple safety concerns, it may be advantageous to combine those sensors via a single CPU (as shown here) and/or communications backhaul and/or power source versus having a series of sensors that are addressed discreetly. For example, a need may arise that requires one sensor each to address assault, strangulation, and bathroom monitoring. Having a single communication, power, CPU, and/or physical package would significantly reduce the costs of materials, and installation. Device management would also be simplified. Multiple transducers could be combined in the same physical package or as a hub and umbilical cables to individual sensors such that a single communication backhaul to a central computer, whether wired or wireless, and power are maintained.

Figure 2:
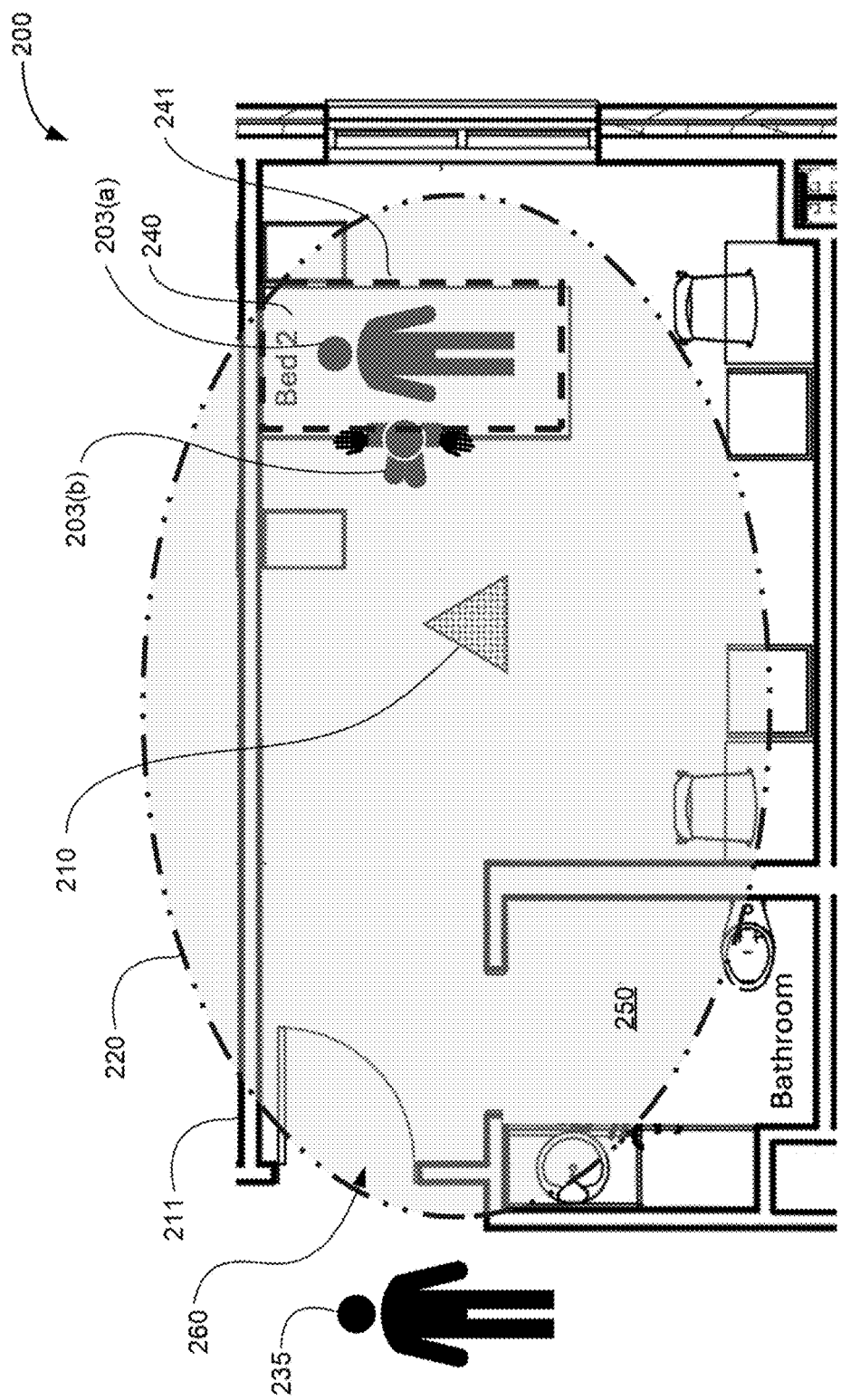
FIG. 2 is a simplified diagram showing a first example implementation of a patient monitoring system.

FIG. 2 is a simplified diagram showing a first example implementation of a patient monitoring system 200. The monitoring system 200 can include a transducer module 210 mounted in a patient's room 211. The transducer module 210 can be an example of the transducer module 110 of FIG. 1. As shown, the transducer module 210 may be centrally mounted to maximize a monitoring region 220. In some examples, the transducer module 210 can generate a 3D point cloud of people and objects within the monitoring region 220. Thus, in some examples, the transducer module 210 can determine and locate a patient 203 (a), a bed 240, a bathroom 250 and a doorway 260.

Generally, the transducer module 210 can determine the location of people and objects with a high degree of accuracy (in some examples, on the order of within 250 to 500 thousands of an inch). Additionally, the transducer module 210 can locate any feasible item in 3D space. Thus, the 3D point cloud can provide a 3D location of people and objects. For example, the transducer module 210 may locate the patient 203 (a) as not only on a bed, but also twenty-two inches above the floor. In some examples, the transducer module 210 can also track the patient 230 (*a*) moving from a first position to a second position (shown as patient 203 (*b*)).

Using the data in the 3D point cloud, the central processor (not shown), coupled to the transducer module 210, can monitor a patient in the bed 240. Therefore, at night when the patient should be sleeping in the bed 240, the central processor can detect and track the patient as the patient moves from a lying to a sitting position.

In some examples, the central processor can establish a monitoring zone 241 around the bed 240. A monitoring zone 241 can function as an artificial boundary around or near any feasible object or location. Thus, at night when the patient is sleeping, the transducer module 210 and/or the central processor can detect a second person 235 as they cross the monitoring zone 241. Upon detection of the second person 235, the transducer module 210 or the central processor can send a notification alert to monitoring personnel.

In some examples, the transducer module 210 can detect and locate the bathroom 250 and the doorway 260. Thus, the transducer module 210 can monitor activities that occur within a predetermined distance from the bathroom 250 or the doorway 260. For example, the transducer module 210 can detect the second person 235 in the doorway 260. If the second person 235 is detected coming through the doorway 260 outside of normal visiting hours, then a notification alert is sent to monitoring personnel. In another example, if the patient is located on the floor by the bathroom 250 (perhaps having fallen), then a notification alert is sent to the monitoring personnel. The patient may have had a slip and fall incident and may need assistance.

In some examples, a dwell time can be determined from the 3D point cloud from the transducer module 210. A dwell time is a time period associated with a person being detected or located with respect to a particular location. The dwell time can be a consideration when sending a notification alert. For example, if the second person 235 is located near the doorway 260, but the dwell time of the person is less than a predetermined time period (for example, less than ten seconds), then no notification alert may need to be sent. In another example, if the dwell time for this event is greater than the predetermined time period, then a notification alert may be sent.

Figure 3:
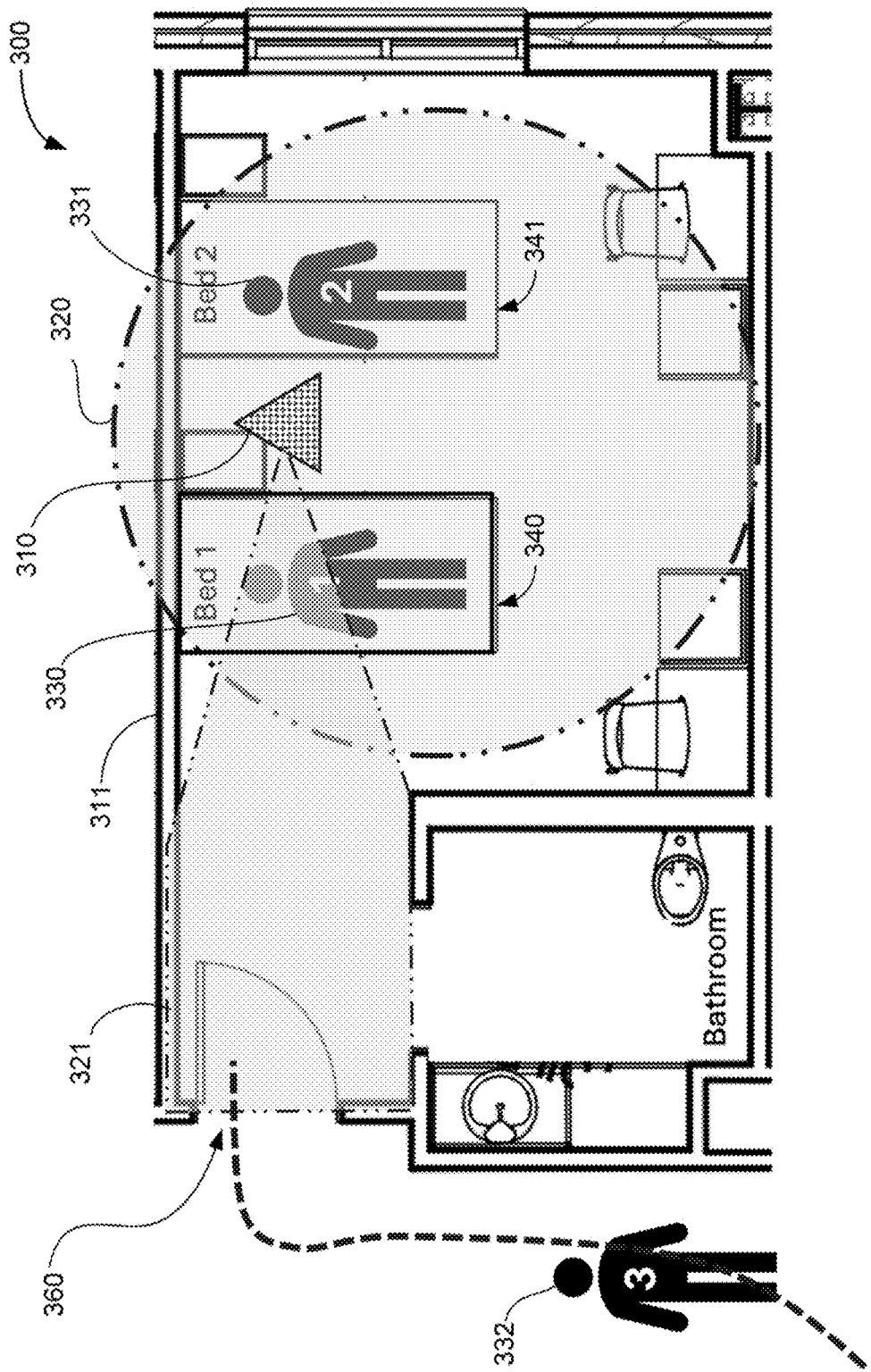
FIG. 3 is a simplified diagram showing a second example implementation of a patient monitoring system.

FIG. 3 is a simplified diagram showing an example implementation of a monitoring apparatus (e.g., monitoring system) 300. The monitoring apparatus 300 may include a transducer module 310 (e.g., mmWave Radar module) that may be mounted in a patient's room 311. The radar module may be mounted in the ceiling and may be covered by drywall, paint, etc. or otherwise fully concealed. The transducer module 310 can be an example of the transducer module 110 shown in FIG. 1. In some examples, the transducer module 310 may include a first transducer and a second transducer (individual transducers not shown) to generate a 3D point cloud of a first monitoring region 320 and a second monitoring region 321.

In any of these methods and apparatuses one or more processor, e.g., a remote processor, may be coupled to the system (e.g., to the transducer) to process and/or control the transducer module and to analyze (in real or near-real time), and/or transmit, and/or optionally store (or store a summary of the monitoring) the data including point cloud data and/or a truncated, e.g., annotated, version of the data. In any of these methods and apparatuses, one or more monitoring stations (not shown) may be used and may be in communication with the transducer module. The monitoring 'station' may include a remote processor that may transmit all or some of the data (e.g. point cloud data) to one or more remote processors, such as a hand-held processor (e.g., tablet, phone, smartwatch, laptop, etc.) for review by a caregiver or other user.

In the example of FIG. 3, the 3D point cloud of the first monitoring region 320 can be used to monitor a first patient 330 and a second patient 331. The 3D point cloud of the first monitoring region 320 can also be used to detect a first bed 340 associated with the first patient 330 and a second bed 341 associated with the second patient 331. The monitoring system 300 can determine if the first patient 330 joins the second patient 331 in the second bed 341 or if the second patient 331 joins the first patient 330 in the first bed 340. In either case, the monitoring system 300 can send a notification alert to the monitoring staff, accordingly.

The second monitoring region 321 can monitor a doorway 360 of the patient's room. For example, the second monitoring region 321 can be used to detect person 332 entering though the doorway 360. In some examples, the 3D point cloud associated with the second monitoring region 321 can be used to determine whether the door is open or closed. The monitoring system 300 can send notification alerts based on the detection of the person 332 and/or the state of the door (open or closed). Although not shown in FIG. 3, one or more regions within the monitoring zone (e.g., one or more "geofences") may be established or defined, e.g., by the user and/or automatically, for any feasible region within the patient's room 311, as described with respect to FIG. 2. In some cases beds may be partitioned within the system and regions considered "bed" may be monitored using a different set of hierarchical rules for determining assault and/or status of the patient. Also a dwell time associated with any patient or person may also be detected. Thus, monitoring zone and dwell time (and/or time of day), and/or activity (e.g., within the patient-specific point cloud) information may be combined with patient location information (e.g., overall position of the patient-specific point cloud) to determine patient welfare.

In some examples, the second (or more) monitoring region(s) 321 may include all or part of an entryway (doorway) to a bathroom. The monitoring system 300 can track a patient as they leave one of the beds and enter the bathroom. In some examples, the monitoring system 300 can limit false alerts to the monitoring personnel. In other words the monitoring system 300 can determine whether a patient is traveling or moving to an allowed (safe) location or an unallowed (unsafe) location and alert the monitoring staff accordingly.

In the example of FIG. 3, the first monitoring region 320 can overlap the second monitoring region 321. However, in general, the monitoring regions do not need to overlap. One such example is shown in FIG. 4.

Figure 4:
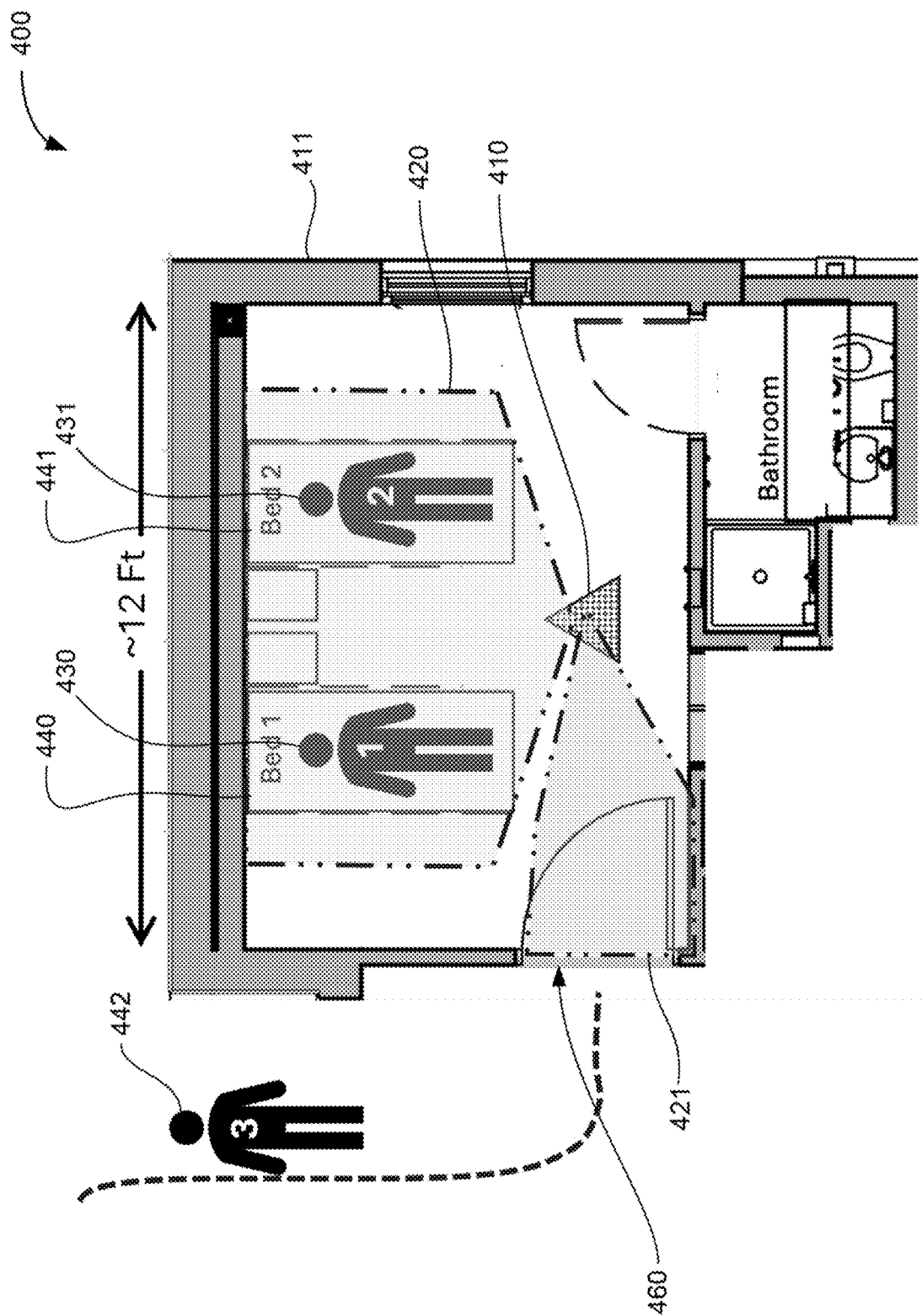
FIG. 4 is a simplified diagram showing a third example implementation of a patient monitoring system.

FIG. 4 is a simplified diagram showing an example implementation of a monitoring apparatus (e.g., system) 400. The monitoring apparatus 400 may include a transducer module 410 mounted (e.g., a mmWave radar module or sub-system) in a patient's room 411. The transducer module 410 can be an example of the transducer module 110 of FIG. 1. In some examples, the transducer module 410 may include one or more transducers (not shown) to generate a 3D point cloud of a first monitoring region 420 and a second (or more) monitoring region 421. A third or more monitoring region may include the bathroom door. In general, the entire room may be monitored.

Similar to FIG. 3, the 3D point cloud of the first monitoring region 420 can monitor a first patient 430, a first bed 440, a second patient 431, and a second bed 441. A 3D point cloud for the second monitoring region 421 can monitor a doorway 460 and detect whether a person 442 enters the doorway 460. In this example, the first monitoring region 420 does not overlap with the second monitoring region 421.

The 3D point cloud of the first monitoring region 320 can also be used to associate the first bed 340 with the first patient 330 and a second bed 341 with the second patient 331. The monitoring system 300 can determine if the first patient 330 joins the second patient 331 in the second bed 341 or if the second patient 331 joins the first patient 330 in the first bed 340. In either case, the monitoring system 300 can send a notification alert to monitoring staff accordingly.

Figure 5A:
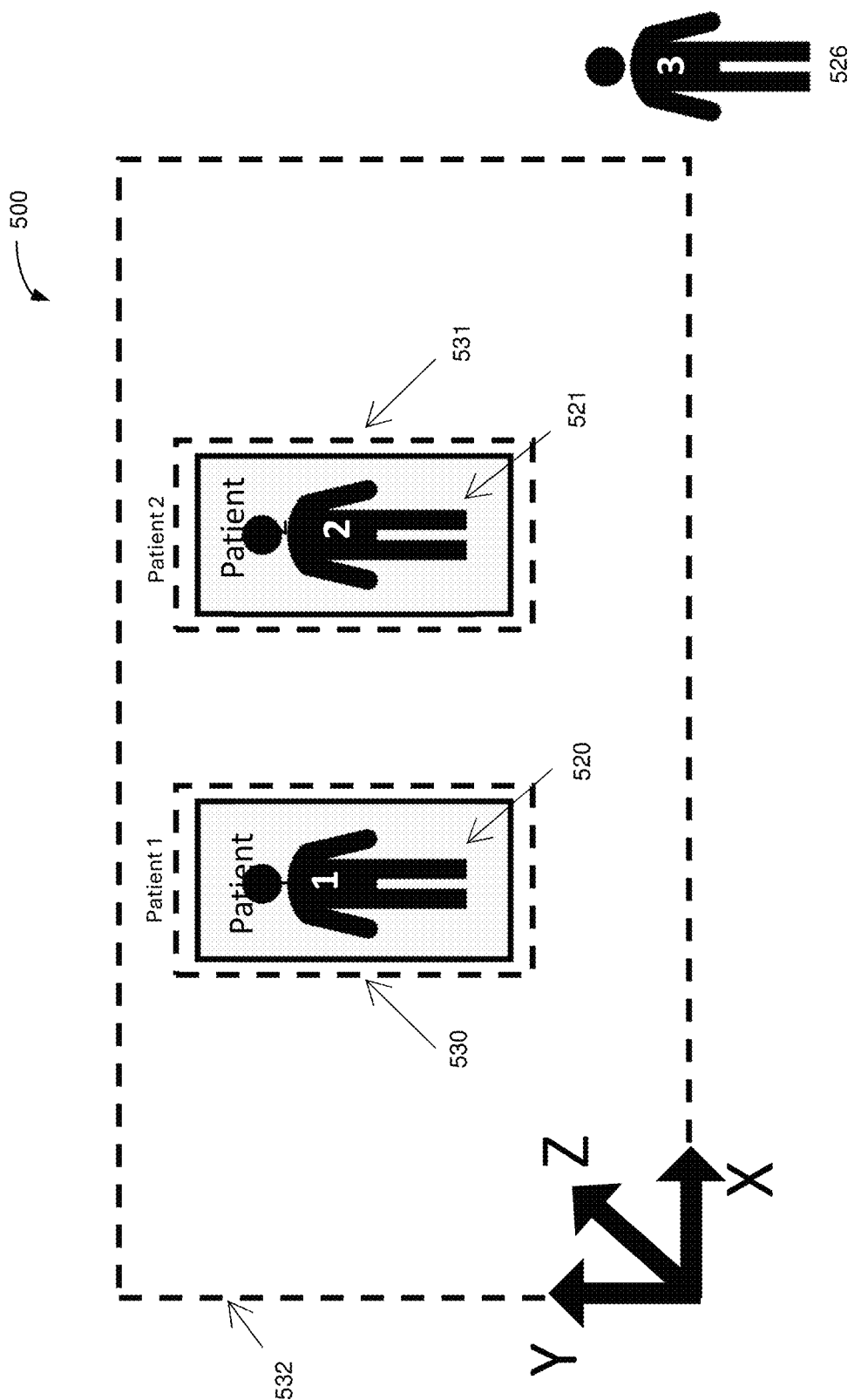
FIG. 5A shows an example of virtual zones provided in a patient's room.

As mentioned above, any of these methods and apparatuses identify and monitor one or more sub-regions within a monitored zone differently (e.g., 'geofenced' regions). FIG. 5A shows an example of geofencing provided in a patient's room 500. The geofencing may be implemented by any feasible patient monitoring system, such as the monitoring system 100 of FIG. 1. The patient's room 500 may include a transducer module 510, a first bed 520, and a second bed 521. The first bed 520 may be associated with a first patient and the second bed 521 may be associated with a second patient.

In some examples, the transducer module 510 can directly or indirectly generate a 3D point cloud of the patient's room 500. The patient monitoring system (not shown) can identify the first bed 520 and the second bed 521 within the 3D point cloud. For example, the patient monitoring system can use conventional dimensions of beds to identify the first bed 520 and the second bed 521 within the patient's room 500. In FIG. 5A the patients, 1 and 2, are in the beds, while a third person 526 (e.g., patient or staff) is outside of the sleeping area. In some cases, staff attention to patients (e.g., rounding) may be monitored and tracked by the apparatus, and may be helpful in confirming caregivers are monitoring on a predetermined schedule. This data may be tracked, stored, transmitted, etc.

Figure 5B:
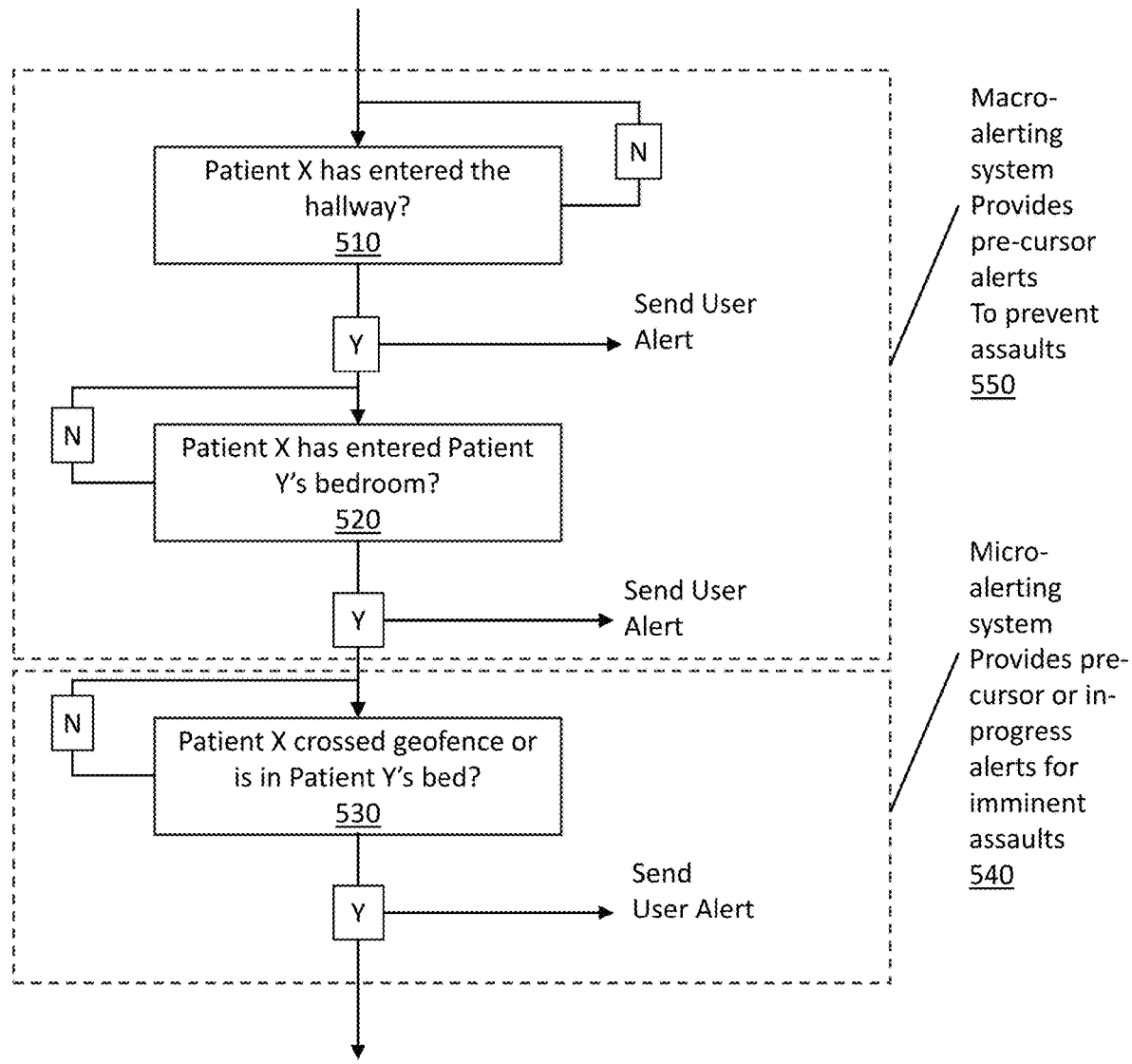
FIG. 5B illustrates one example of a method of monitoring virtual zones as described herein.

The methods and apparatuses described herein may monitor these zones as part of the general monitoring described herein. For example, FIG. 5B illustrates one example of a method of monitoring a patient within a room including at least one zone; such as a bed region. In this example the apparatus may perform this method in an ongoing manner, e.g., determining if a point-cloud indicating a person (e.g., patient or caregiver), whose identify may be confirmed, e.g., by a wearable sensor or other device, has entered the hallway 510 at or near the doorway into the room. This monitoring may be performed continuously (and/or at an ongoing monitoring frequency, typically greater than 1 Hz). If a person is detected in the hallway, an alert may be sent (or a verification check performed, and the monitoring may be continued, to determine if the person or patient (e.g., patient X) has entered the patient bedroom (patient y's bedroom) 520. If not, then monitoring may be continued. If yes, a person has entered the bedroom, an alert may be sent and further, regional/zone monitoring may be performed. The macro alerts may be provided 550 as precursor alerts to prevent or limit assaults. Within the room, the apparatus may determine if a patient has crossed the monitoring zone (e.g., bedding area) within the room 530. If so, a micro alerting system/sub-system 540 may be triggered, which may provide precursor or 'in progress' alerts of imminent assaults. Although these monitoring components may be performed sequentially, as shown, they may all be performed concurrently.

Thus, any of these apparatuses can establish or define monitoring zones within the patient's room 500. For example, the patient monitoring system can define a first zone or region ('geofence') 530 around the first bed 520 and a second zone 531 around the second bed 521. In some examples, the first zone 530 may extend beyond the first bed 520 by a predetermined distance. Similarly, the second zone 531 can extend beyond the second bed 521 by another predetermined distance. Thus, the predetermined distance used by the first monitoring zone 530 can be different than the second monitoring zone 531. In some other examples, the predetermined distances associated with the first monitoring zone 530 and the second monitoring zone 531 can be the same.

The patient monitoring system can monitor movement within the patient's room 500. In particular, the patient monitoring system can detect if either patient in either bed crosses either monitoring zone. If a patient is detected crossing a monitoring zone, then the patient monitoring system can send a notification alert to monitoring personnel.

In some cases, the patient monitoring system can also monitor dwell time associated with patient movement in the patient's room 500. If a patient is found to have crossed a monitoring zone for less than a predetermined dwell time, then no alert may be sent. Such movements may be purely transitory. Perhaps the patient is stretching or going to the bathroom. On the other hand, if a patient is found to have crossed a monitoring zone for more than a predetermined dwell time, then the patient monitoring system may send an alert to monitoring personnel.

The patient monitoring system may establish or define a third monitoring zone 532 surrounding both the first bed 520 and the second bed 521 within the patient's room 500. Then, the patient monitoring system can detect when any person crosses the third monitoring zone. In some instances, a patient may be leaving the patient's room 500. In other cases, a third person may be entering the patient's room 500. The patient warning system can send a notification alert when any crossing of the third monitoring zone 532 is detected.

Figure 6A:
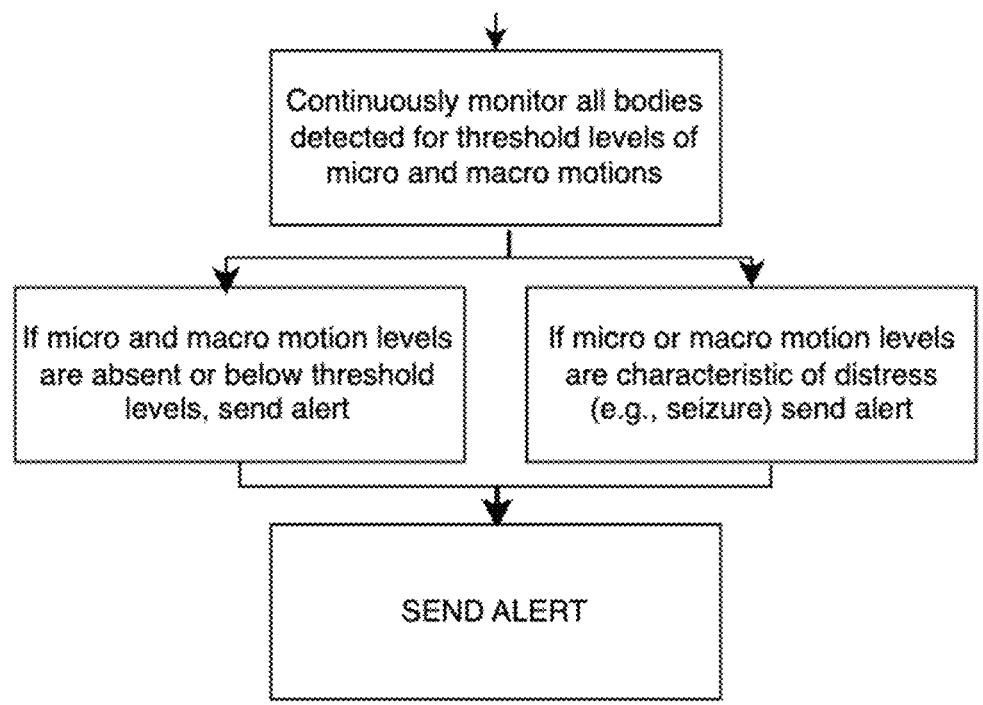
FIG. 6A schematically illustrates one example of a method of monitoring one or more patients for signs of life that may form a part of an apparatus and/or method as described herein.

For example, any of these apparatuses may be configured to detect/monitor for signs of life and/or signs of assault. In FIG. 6A the method includes monitoring micro (e.g., respiration, etc.) and macro (e.g., walking, moving, etc.) movements or motions by each person in the room. If the macro and micro movements are below a critical lower threshold level, the apparatus may send an alert. Similarly, if the micro and/or macro motion levels are characteristic of a distress state for the patient, the apparatus may send an alert.

Figure 6B:
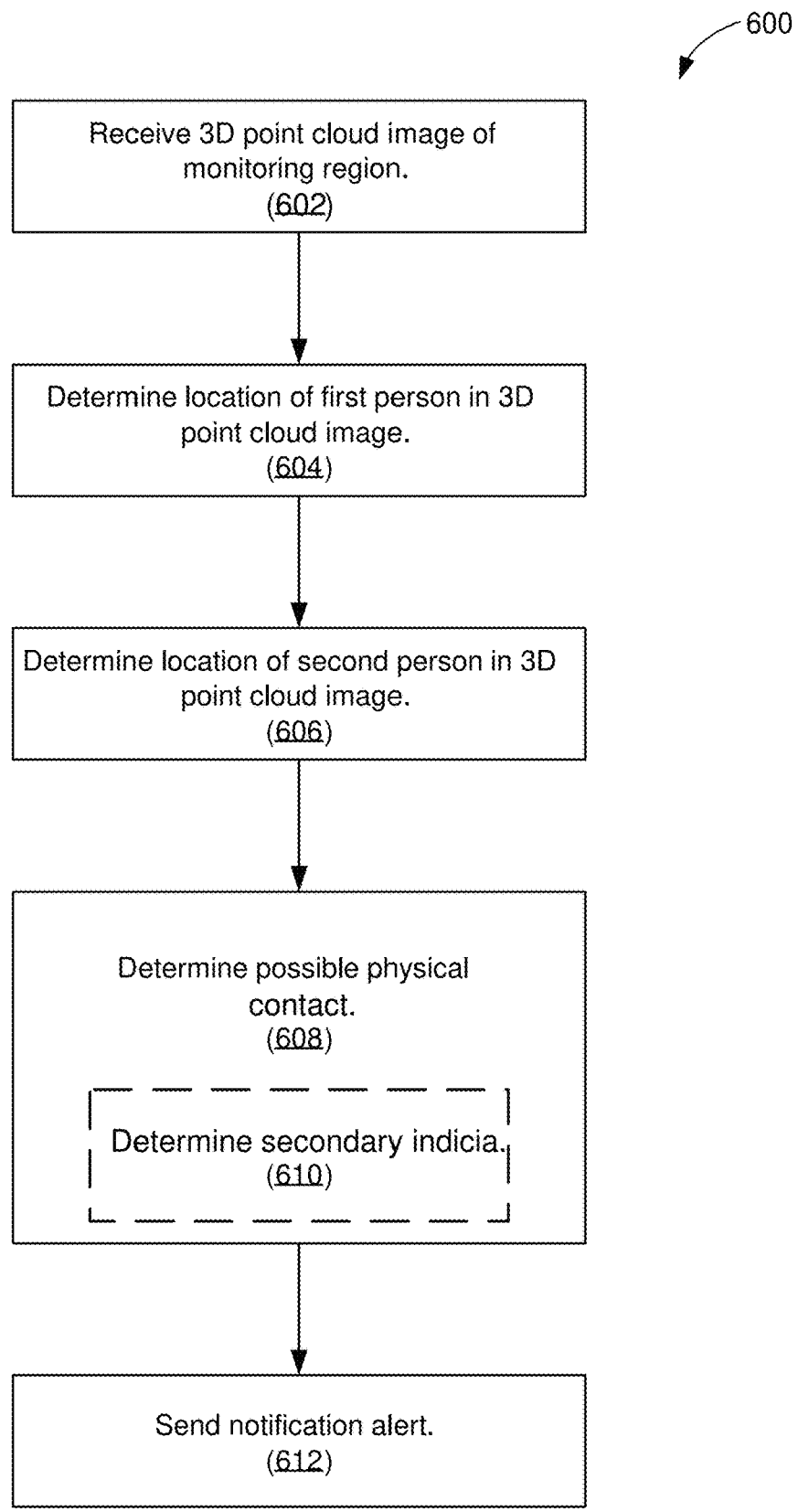
FIG. 6B is s diagram showing one example of a is a flowchart showing an example method for monitoring patient activity.

FIG. 6B is a flowchart showing an example method 600 for monitoring patient activity. Some examples may perform the operations described herein with additional operations, fewer operations, operations in a different order, operations in parallel, and some operations differently. The method 600 is described with respect to the monitoring system 100 of FIG. 1, however, the method 600 may be performed by any other suitable system or device.

The method 600 begins in block 602 as the monitoring system 100 receives or obtains a 3D point cloud of a monitoring region. For example, the 3D point cloud may be generated and received from one or more transducer modules, such as the transducer module 110 of FIG. 1. The 3D point cloud may include three dimensional positional information associated with objects within a monitoring region (within a sensing region associated with one or more transducers included within one or more transducer modules). In some examples, the 3D point cloud data may be refreshed or updated in "real time." Real time data may have a latency of a few microseconds to tens of milliseconds. The monitoring region can be any feasible area or room, including sleeping quarters (bedrooms), hallways, dining areas, or the like. In some examples, the 3D point cloud may be a combination of 3D point cloud data from multiple transducers.

Next, in block 604, the monitoring system 100 determines a location of a first person in the 3D point cloud. In some examples, the monitoring system 100 can identify a person in the 3D point cloud based on dimensions of typical patients that are expected to be within the monitoring region. In some other examples, the monitoring system 100 can monitor a monitoring region and "learn" 3D point cloud patterns associated with a patient.

Next, in block 606, the monitoring system 100 determines a location of a second person in the 3D point cloud. The second person is different than the first person.

Next, in block 608, the monitoring system 100 determines possible physical contact between the first person and the second person. A possible physical contact can include an assault, or any possible at-risk (including self-harm) behavior. In some examples, the possible physical contact may be based when the location of the first person is with a predetermined distance of the location of the second person.

In some examples, determining a possible physical contact may include determining one or more secondary indicia in block 610. Determining secondary indicia may be optional, as indicated by the dashed lines in FIG. 6. The secondary indicia may be used along with the determined locations of the first person and the second person to determine a possible physical contact. An example secondary indicia is dwell time. The dwell time is a time period associated with a person being detected or located with respect to a particular location. For example, if the first person is within a predetermined distance of the second person for a time that exceeds a predetermined time period, then a possible physical contact may exist.

Another example secondary indica is a determination of beds. The monitoring system 100 can determine where possible beds can be located within the monitoring region. Determining bed location can enable the monitoring system 100 to monitor whether someone approaches an already occupied bed or whether two (or more) people are in the same bed region. In some cases, the monitoring system 100 can determine whether a patient is lying down on the bed, or sitting on the bed.

Another example secondary indica is geofencing. The monitoring system 100 can determine, establish, or define one or more monitoring zones within monitoring region. For example, a monitoring zone may be established or defined around each bed within a monitoring region. If a person, not associated with a particular bed, crosses a monitoring zone, then the monitoring system may detect a possible physical contact.

Another example secondary indicia is a determination of a bathroom, or more particularly a determination of a door or doorway associated with a bathroom. The monitoring system 100 can determine the location of a bathroom within the monitoring region. If a person leaves the bed region and enters the bathroom, then no possible physical contact is present. However, if the person exceeds a predetermined dwell time in the bathroom, then the monitoring system 100 can generate an alert associated with the person in the bathroom. (The person may have fallen, become unconscious, or the like.)

Another example secondary indicia is a determination of vital signs. In some examples, the monitoring system 100 can determine respiration rate through the rising and falling of the patient's chest, particularly while lying on a bed. In another example, vital signs (heart rate, body temperature, blood oxygen) can be determined through a patient-worn wearable device and communicated to the monitoring system 100. If any vital sign exceeds a predetermined threshold, then a possible physical contact between two or more people may occur. For example, an elevated heart rate may be the result of a physical assault. In some examples, the wearable device can provide additional location information of the wearer. For example, location information may be determined by a wireless location determination system described in U.S. patent application Ser. No. 18/705,411, filed Apr. 26, 2024, which is commonly assigned, the disclosure of which is incorporated by reference herein in its entirety. In some examples, the patient-worn device may communicate with one or more wireless access points and enable the monitoring system 100 to determine a location of the patient through the one or more access points. The patient-worn device may enable the monitoring system 100 to track patient care interactions between staff and patients, particularly with scheduled care intervals.

Another example secondary indicia is a determination of velocity vectors. In some examples, the monitoring system 100 can determine velocity vectors associated with some or all of any persons within a monitoring region. If the velocity vectors exceed a predetermined threshold, then the person having the velocity vector may be involved with a possible physical contact (such as an assault). The secondary indicia described herein is not meant to be an exhaustive list, but rather describe exemplary indicia.

In block 612, the monitoring system 100 sends a notification alert based on the determined possible physical contact. In some examples, the monitoring system 100 can send encrypted alert messages through wired or wireless communication mediums to one or more monitoring staff. The monitoring staff can receive the alert messages on mobile devices such as tablet computers, smart phones, and/or smart watches. In some examples the monitoring system 100 can generate and save a system log (logfile) that includes time and location of possible physical contact and the time and contents of any notification alerts that were sent. In some variations, the system log can include raw transducer data or 3D point cloud data that is periodically saved.

Figure 7:
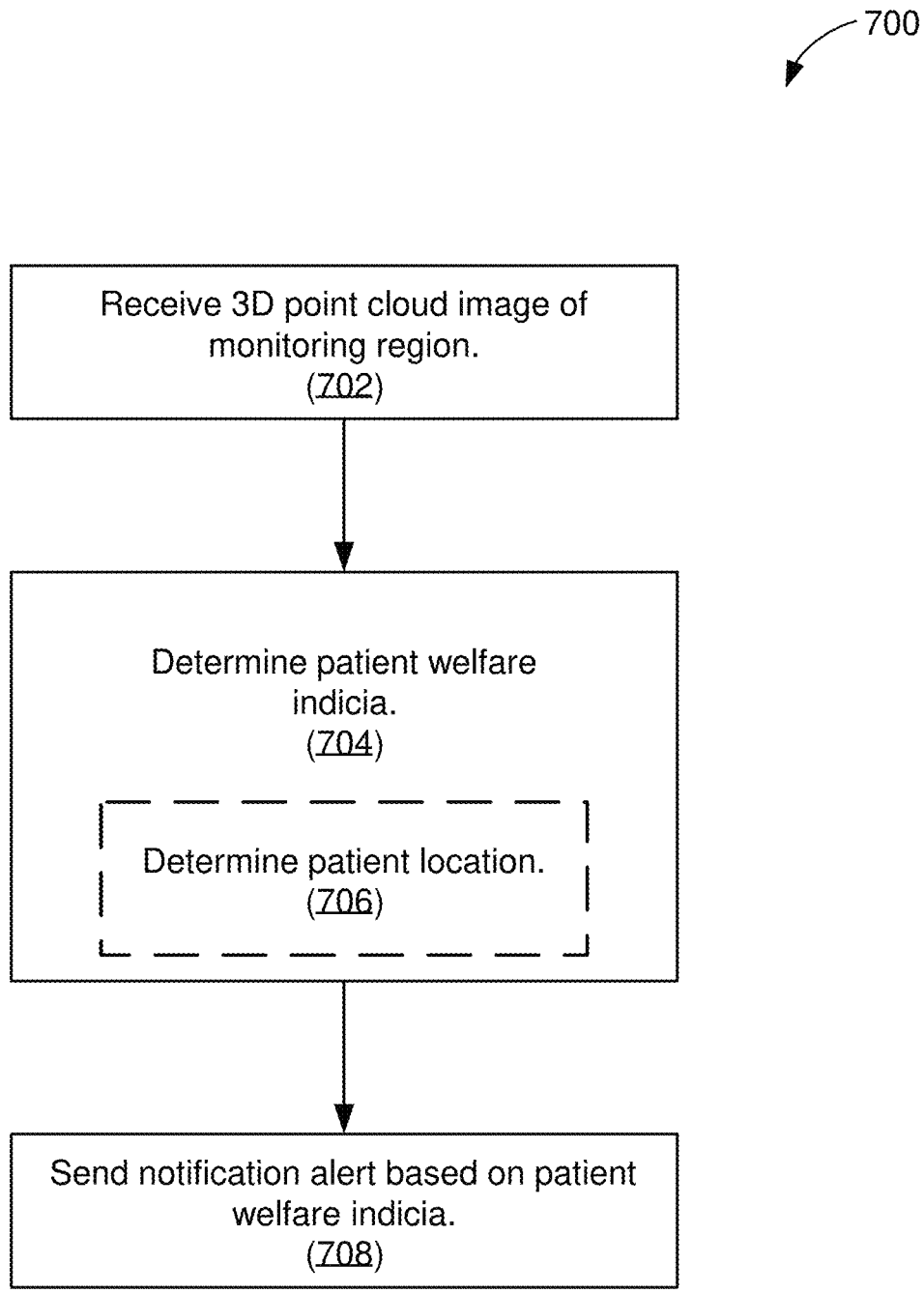
FIG. 7 is a flowchart showing an example method for monitoring patient welfare.

FIG. 7 is a flowchart showing an example method 700 of monitoring patient welfare. Some examples may perform the operations described herein with additional operations, fewer operations, operations in a different order, operations in parallel, and some operations differently. The method 700 is described with respect to the monitoring system 100 of FIG. 1, however, the method 700 may be performed by any other suitable system or device.

Patients in healthcare settings may experience rapid declines in their health that may result in death or serious harm. In many settings, patients are not connected to traditional medical monitoring equipment on a continuous basis, so it can be difficult to detect and intervene when patients rapidly deteriorate, especially when the patient is in bed. In some examples, patients at higher risk of death and injury are the elderly, those with co-occurring conditions, those under substance detox treatment, and those at risk of self-harm and suicide. Periodic caregiver rounding at night is typically insufficient to catch a patient deteriorating due to the infrequency of rounds, lack of compliance or inattention to the patient's vitals (e.g., respiration). Patient-worn devices that incorporate biometric sensors can alert staff when a patient expires or may be in decline. However, a patient deteriorating or otherwise in distress might be missed by a patient-worn device or by false positive assessments. Transducer data, especially when combined with data from a patient-worn device, can provide a greater assurance of catching a patient in decline. Some transducers can detect sub-mm patient movements from respiration as well as subtle body movements that might be missed by a patient-worn device. Patients undergoing detox or self-asphyxiation can experience seizures that affect the whole body. Some transducers are well suited to recognize and these conditions. Detecting seizures with a patient in bed using just a patient-worn device is inherently more difficult since the patient-worn device can primarily sense seizure movement effecting the arm and these movements may be damped by bedding. Combining data from a patient-worn device with transducer data can provide the patient's ID along with heart rate and movements associated with breathing and seizures thereby providing a more reliable system to alert for serious patient decline or death.

The method 700 begins in block 702 as the monitoring system 100 receives or obtains a 3D point cloud of a monitoring region. For example, the 3D point cloud may be generated and received from one or more transducer modules, such as the transducer module 110 of FIG. 1. The 3D point cloud may include three dimensional positional information associated with objects within a monitoring region (within a sensing region associated with one or more transducers included within one or more transducer modules).

Next, in block 704 the monitoring system 100 determines patient welfare indicia. In some examples, some of the patient welfare indicia may be similar to the secondary indicia described with respect to block 610 in FIG. 6. Thus, patient welfare indicia may include dwell time, object (bed, doorway . . . ) determination, geofencing, patient vital signs, velocity vectors, and the like. Another example of welfare indicia is a detection of a ligature. The presence of a ligature can indicate that the patient is contemplating self-harm. In general, the detection of one or more of these welfare indicia may indicate that the patient's welfare is in jeopardy.

In some aspects, determining patient welfare indicia can include determining a location of the patient in block 706. This operation may be optional as shown by the dashed lines in FIG. 7. In some examples, if the patient's determined location is in or near a particular area and the position exceeds a dwell time threshold, then the patient's welfare may be unsafe or at-risk. For example, the monitoring system 100 may determine that the patient is lying on the floor for a period of time that exceeds a particular dwell time. Such circumstances may indicate that the welfare of the patient is in jeopardy. In another example, the monitoring system 100 may determine that the patient is at or near a doorway for a period that exceeds a predetermined dwell time. A doorway may provide an opportunity for the patient to perform self-harm (hanging, asphyxiation, or the like). Again, the patient's welfare may be in jeopardy.

In some aspects, patient location (block 706) and patient welfare indicia (block 704) can be combined to determine whether the patient has moved to, and is staying at, an off-limits location. For example, the monitoring system can track the location of a patient that has moved from a location with no restrictions, to an off-limits location, such as a different patient's room or bed, particularly during a time of day when such visits are restricted or forbidden.

Next, in block 708, the monitoring system 100 sends a notification alert to monitoring staff based on the welfare indicia determined in block 704. In some examples the monitoring system 100 can generate and save a system log (logfile) that includes time and location of the patient, patient welfare indicia, and the time and contents of any notification alerts that were sent.

Figure 8A:
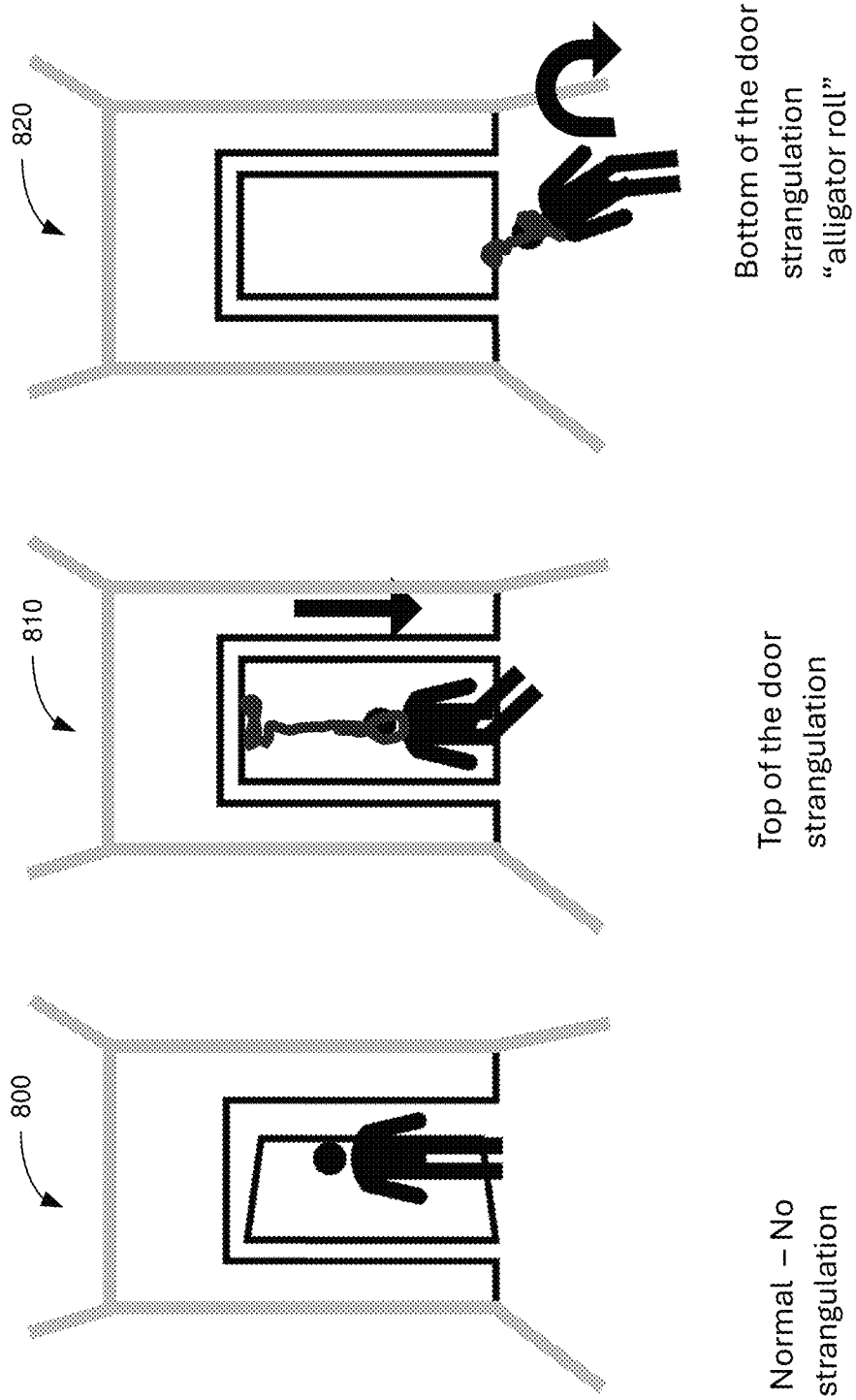
FIG. 8A shows different locations and welfare statuses associated with a patient.

FIG. 8A shows different locations and welfare statuses associated with a patient. Drawing 800 shows a patient under normal circumstances with no danger to his/her welfare. In particular, no threat regarding strangulation is present. Drawing 810 shows a much different situation for the patient. In this example, a ligature is attached to an upper portion of a door or doorway. The patient may attach himself for the ligature and intend to strangle or asphyxiate himself or herself. Drawing 820 shows a ligature attached to a bottom of the door. The patient may attach himself to the ligature and intent to strangle or asphyxiate himself or herself by rolling on the floor. Thus, drawing 810 and drawing 820 show different circumstances where the patient may be at-risk for self-harm.

One example application of the monitoring systems described herein is within a residential hospital setting. In some cases, it is desirable to detect a hanging or a strangulation on the back of a bedroom or bathroom door. Many self-harm and suicides cases in residential hospitals occur in bedrooms or bathrooms. Patients can jam sheets or clothing into the top or bottom of a door and use the free end to strangle themselves. Again, video systems are not allowed in these areas due to privacy and would be very expensive to monitor routinely for every patient. There are several conventional systems designed to catch this type of event. As mentioned, most use pressure, laser or mass sensors to detect something around the top of the door or adding mass to the door. These conventional systems tend to be expensive, disruptive to install and associated with false positives. For example, anytime someone puts their hands on top of door, a notification alert is generated. These conventional systems are also very visible, so patients can trigger them intentionally or attempt hanging in some other way. Most of these conventional systems also do not sense if something has been wedged at the bottom of door. Patients have been known to wedge a sheet or clothing under the door and then "alligator roll" on the floor to asphyxiate themselves.

Figure 8B:
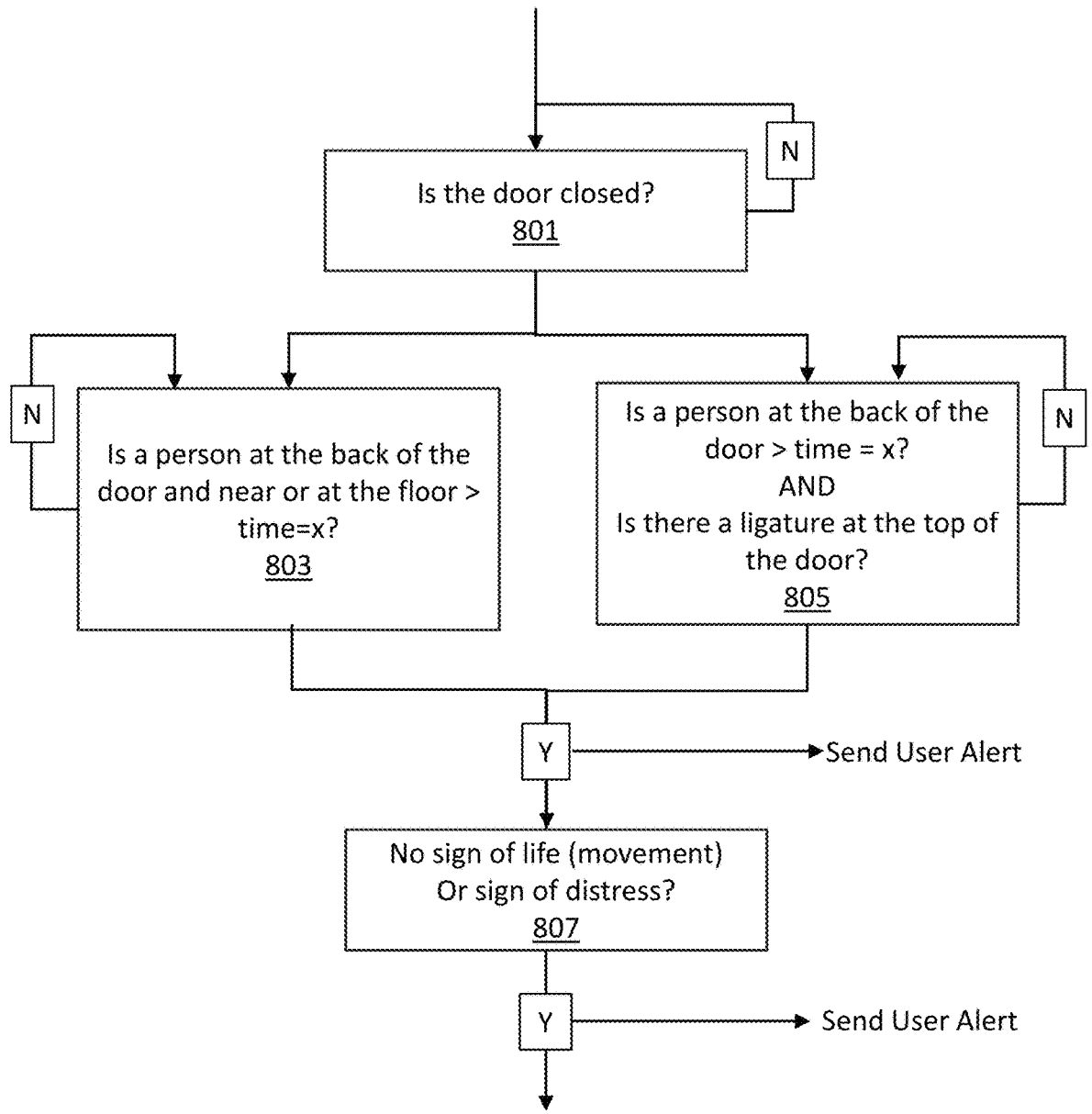
FIG. 8B schematically illustrates an example of a method of detecting distress in a patient (e.g., self-harm) using the apparatuses and methods described herein.

Thus, in general, these methods and apparatuses may detect patient distress, including self-harm as illustrated in FIG. 8A. FIG. 8B schematically illustrates one example of a method of detecting self-harm. In FIG. 8B, the apparatus may include as a region being monitored the doorway (e.g., to the hall, bathroom, etc.). In this example, the apparatus may determine if the door is closed 801 and if it is opened, it may determine if there is a person (identified by the point cloud, as described herein) at the back of the door and near the floor for a timer period that exceeds a threshold (e.g., x min) 803. The apparatus and/or method may also determine if there is a ligature at the top of the door and/or bottom of the door 805. If both are true, then the apparatus may trigger an alert or alarm. The apparatus may continue to monitor for signs of life (e.g., movement) and/or signs of distress, which may be identified as a characteristic type of movement 807. If so, the apparatus may trigger further alerts, requiring immediate attention.

Figure 8C:
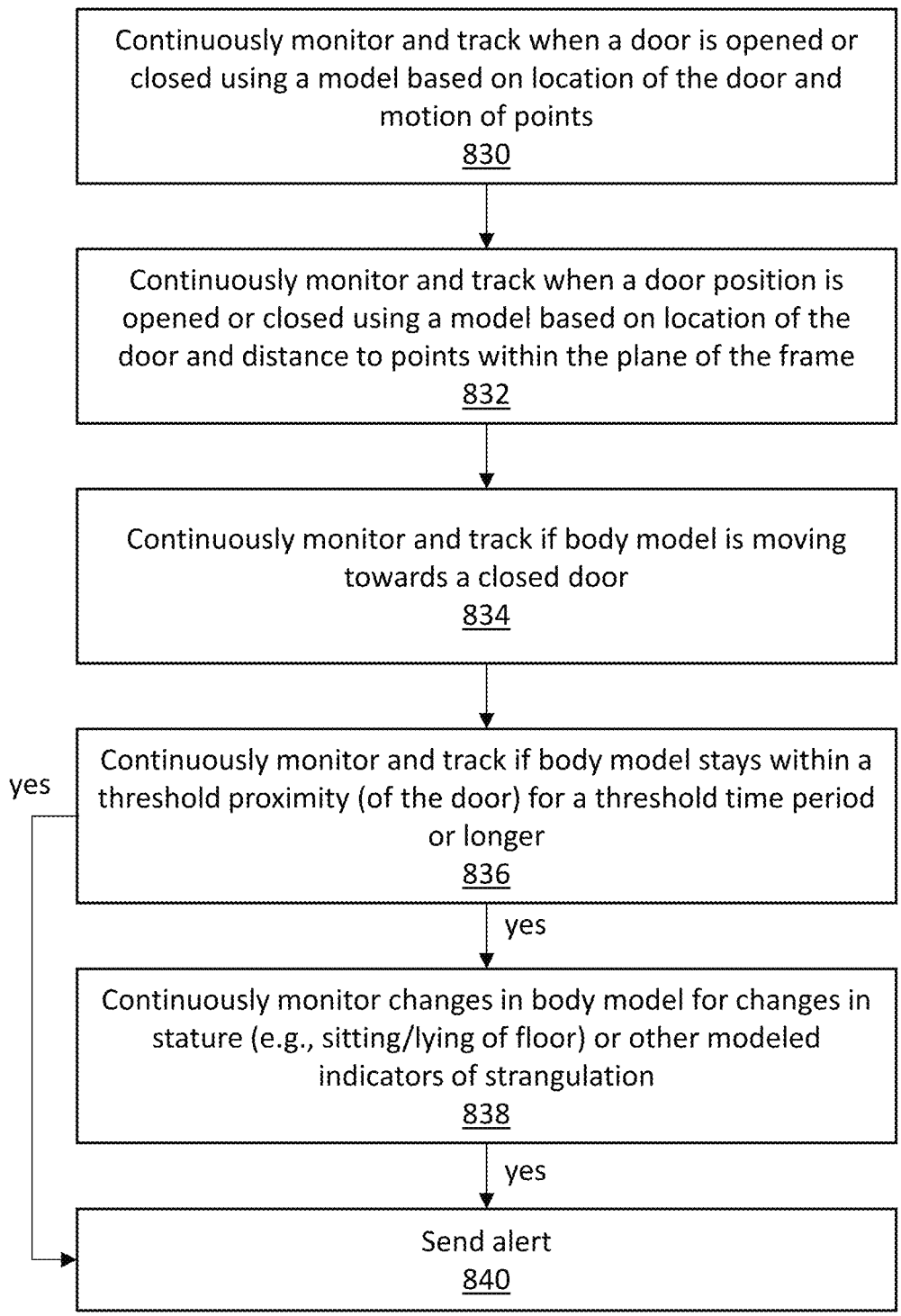
FIG. 8C schematically illustrates an example of a method of detecting distress in a patient (e.g., self-harm including strangulation) using the apparatuses and methods described herein

FIG. 8C shows another example of a method and/or apparatus configured to monitor a room to determine/detect a self-harm attempt, such as strangulation at a door. In FIG. 8C the method may include continuously monitoring and tracking when a door is opened or closed using a model based on location of the door and motion of points (e.g., within a point cloud) 830. The door position may also be continuously or discretely (every x Hz, where x may be any interval between about 1 kHz or faster and about 0.001 Hz), e.g., to track when the door is opened or closed, e.g., using a model based on the location of the door and/or a distance to points within the plane of the doorframe 832. The room may be continuously and/or periodically monitored, to track if a body model is moving towards a closed door 834.

The method may further determine (by continuous or discrete monitoring) to track a body model within the room if it stays within a proximity threshold of the door for a threshold time period or longer 836. The method (or an apparatus configured to perform this method) may continuously monitor for changes in the body model, e.g., changes that indicate, e.g., sitting/lying of floor (recumbent position) or other modeled indicators of strangulation 838. If the person near the door remains at or near the door and transitions to a sitting/laying down body position, based on the radar monitoring, an alert may be triggered 840, e.g., indicating a self-harm.

Figure 9:
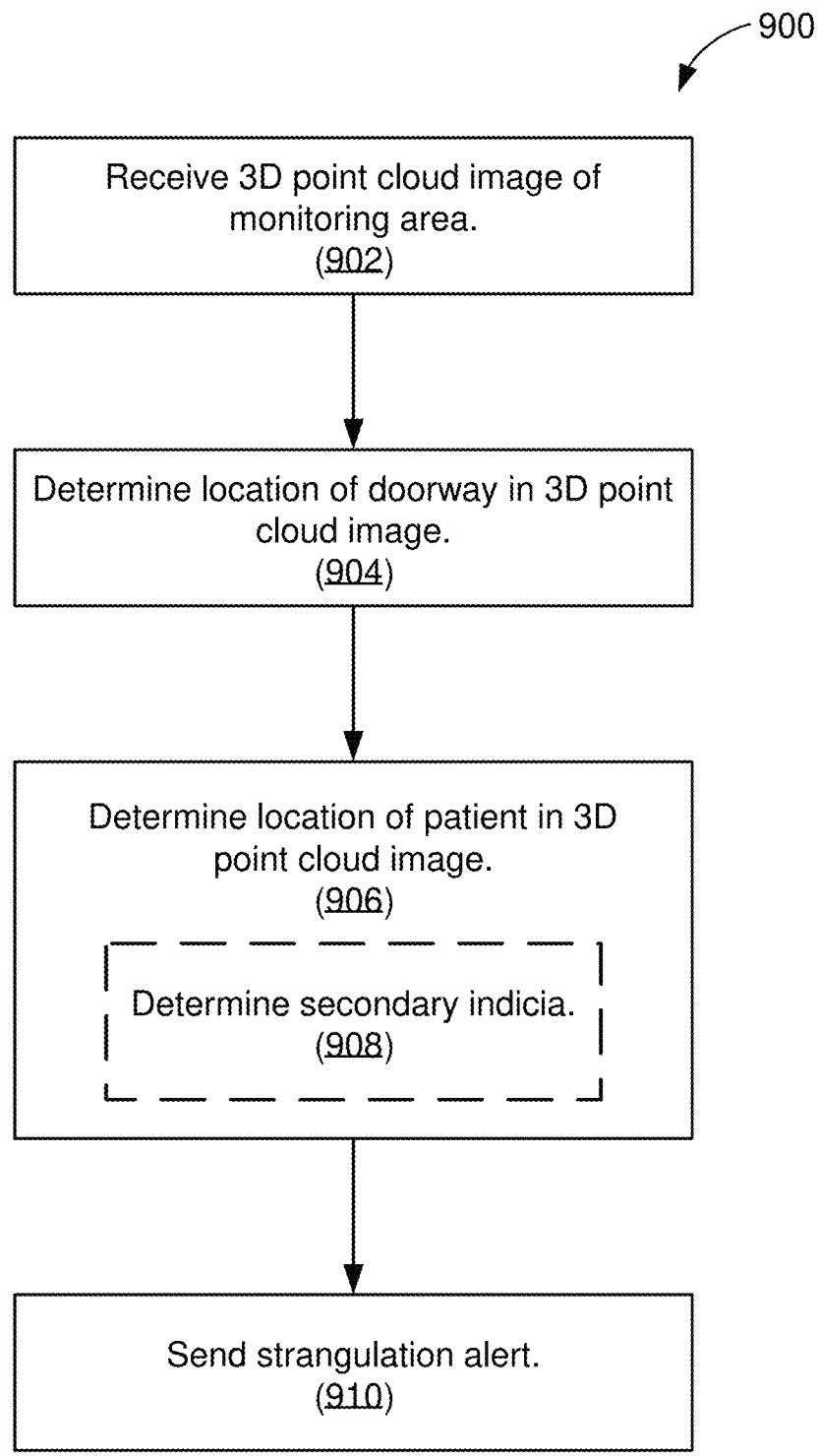
FIG. 9 is a flowchart showing an example method determining a possible strangulation event.

FIG. 9 is a flowchart showing an example method 900 for determining a possible strangulation event. The method 900 is described with respect to the monitoring system 100 of FIG. 1, however, the method 900 may be performed by any other suitable system or device.

The method 900 begins in block 902 as the monitoring system 100 receives or obtains a 3D point cloud of a monitoring region. Next, in block 904, the monitoring system 100 determines a location of a doorway in the 3D point cloud. In some examples, the doorway may be a doorway to enter into the patient's room (from a hallway, for example). In other examples, the doorway may enter a bathroom.

Next, in block 906, the monitoring system 100 determines a location of the patient based on the 3D point cloud. As described with respect to FIGS. 6 and 7, the monitoring system 100 can examine the 3D point cloud data and determine the location of the patient within the monitoring region. In some examples, additional secondary indicia can optionally be determined in block 908. Examples of secondary indicia may include the indicia discussed with respect to FIGS. 6 and 7. In addition, secondary indicia may include determining whether the door associated with the doorway is open or closed. An open door may indicate that the patient is not contemplating self-harm. On the other hand, a closed door may hide the patient and indicate that the patient is at-risk and contemplating self-harm.

Another example of secondary indicia can be the determination (identifying the presence) of a ligature. The presence of a ligature in the 3D point cloud may indicate that the patient is contemplating self-harm. Another example of secondary indicia can be a determination of a location that the ligature is attached. Ligatures attached to upper or lower doorway locations are more likely to be associated with circumstances for self-harm.

Next, in block 910 the monitoring system 100 sends a strangulation alert to monitoring personnel. Once alerted, the monitoring personnel can take steps to protect and assist the patient. In some examples the monitoring system 100 can generate and save a system log (logfile) that includes time and location of the patient, secondary indicia, and the time and contents of any notification alerts that were sent. In some variations, the system log can include raw transducer data or 3D point cloud data that is periodically saved.

In some examples, a transducer module may be configured to perform one or more operations associated with FIGS. 6, 7, and 9. For example, the transducer module 110 of FIG. 1 includes three transducers 101(a)-101(c). The transducer 101(a) may perform operations associated with FIG. 6, the transducer 101(b) may perform operations associated with FIG. 7, and the transducer 101(c) may perform operations associated with FIG. 9. Other combinations are possible. In some examples, the processor 105 may be coupled to any number of transducers and generate any feasible number of notification alerts corresponding to the operations performed by the transducers.

Figure 10:
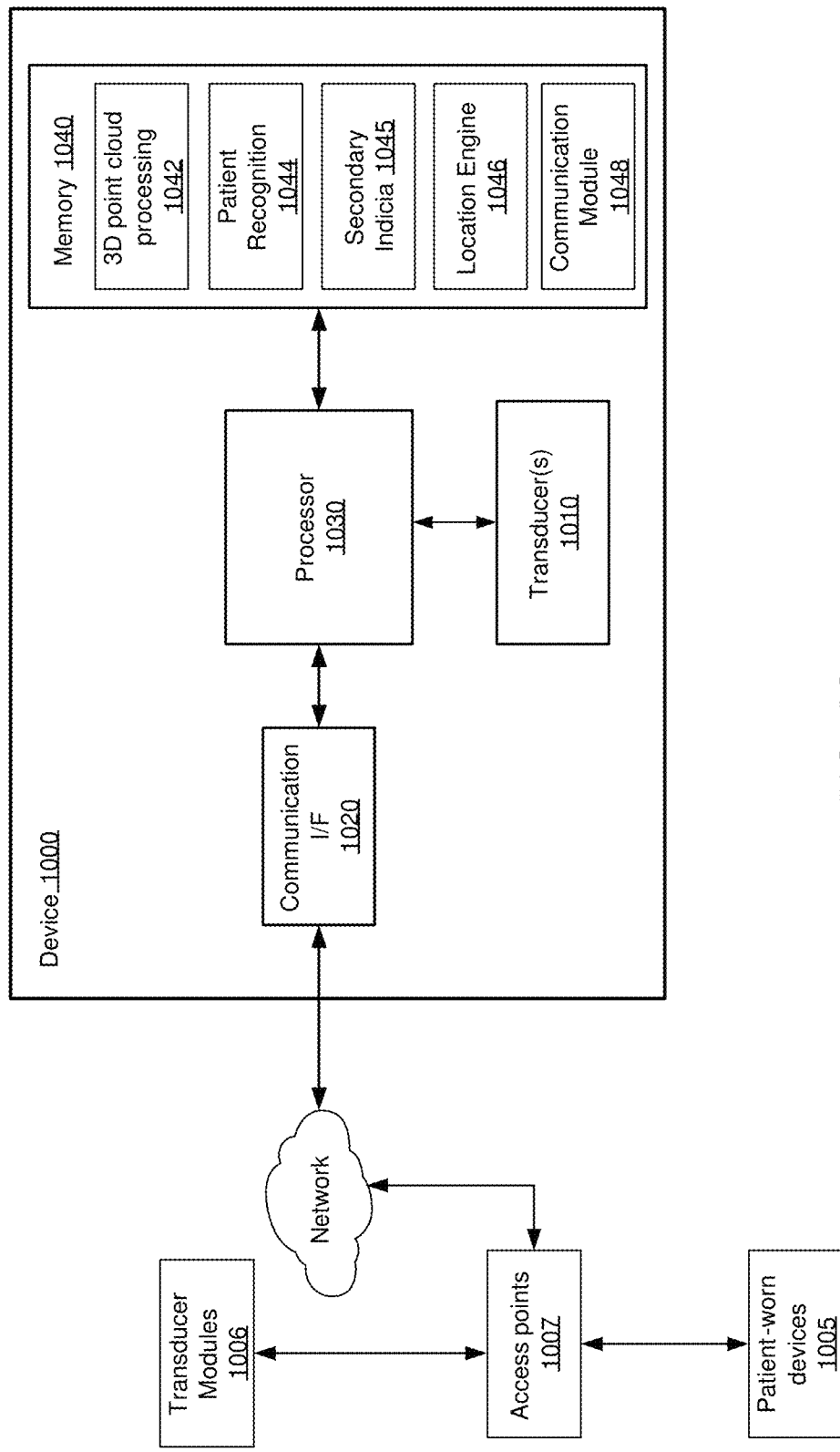
FIG. 10 shows a block the diagram of a device that may form a portion of the monitoring system of FIG. 1.

FIG. 10 shows a block diagram of a device 1000 that may form a portion of the monitoring system 100 of FIG. 1. In some examples, the device 1000 may be all or part of the central processor 120 or the transducer module 110. The device 1000 may include one or more transducer(s) 1010, a communication interface 1020, a processor 1030, and a memory 1040.

The communication interface 1020, which may be coupled to a network (such as the Internet) and to the processor 1030, may transmit signals to and receive signals from other wired or wireless devices, including remote (e.g., cloud-based) storage devices, cameras, processors, compute nodes, processing nodes, computers, mobile devices (e.g., cellular phones, tablet computers and the like) transducer modules 1006, access points 1007, and patient-worn devices 1005. For example, the communication interface 1020 may include wired (e.g., serial, ethernet, or the like) and/or wireless (Bluetooth, Wi-Fi, cellular, or the like) transceivers that may communicate with any other feasible device through any feasible network.

The one or more transducer(s) 1010, which is coupled to the processor 1030, may determine a 3D point cloud. In some examples, the transducer(s) 1010 may be other examples of the transducers 101(a)-101(c) in FIG. 1. Thus, the transducers(s) 1010 can generate a 3D point cloud of a monitoring region.

The processor 1030, which is also coupled to the memory 1040, may be any one or more suitable processors capable of executing scripts or instructions of one or more software programs stored in the device 1000 (such as within memory 1040).

The memory 1040 may include a non-transitory computer-readable storage medium (e.g., one or more nonvolatile memory elements, such as EPROM, EEPROM, Flash memory, a hard drive, etc.) that may store the following software modules:
- a 3D point cloud processing module 1042 to process data from the transducer(s) 1010 and/or the transducer modules 1006 to determine or generate a 3D point cloud;
- a patient recognition module 1044 to identify a patient from the 3D point cloud;
- a secondary indicia module 1045 to determine any feasible secondary indicia within the 3D point cloud;
- a location engine 1046 to determine a location of an object within the 3D point cloud; and
- a communication module 1048 to communicate with other devices.

Each software module includes program instructions that, when executed by the processor 1030, may cause the device 1000 to perform the corresponding function(s). Thus, the non-transitory computer-readable storage medium of memory 1040 may include instructions for performing all or a portion of the operations described herein.

The processor 1030 may execute the 3D point cloud processing module 1042 to generate a 3D point cloud of a monitoring region, particularly when the transducer(s) 1010 or the transducer modules 1006 do not generate a 3D point cloud, but instead generate raw transducer data. If the transducer(s) 1010 or the transducer modules 1006 generate a 3D point cloud of the monitoring region, then execution of the 3D point cloud processing module 1042 may be optional.

The processor 1030 may execute the patient recognition module 1044 to identify possible patients (people) from within the 3D point cloud. In some examples, execution of the patient recognition module 1044 can cause the processor 1030 to locate patients based on typical patient sizes or, in some cases, based on physical dimensions of particular patients that have been entered into the device 1000.

The processor 1030 may execute the secondary indicia module 1045 to determine or identify any feasible secondary indicia described herein. Example secondary indicia can include the identification of objects (doorways, ligatures, etc.), establishment and monitoring of monitoring zones, determination of dwell times, monitoring vital signs, and the like.

The processor 1030 may execute the location engine 1046 to determine the location of patients (through the 3D point cloud or through patient-worn devices 1005) within a monitoring region. For example, execution of the location engine 1046 may cause the processor 1030 to determine a location of a patient, or object within the monitoring region.

The processor 1030 may execute the communication module 1048 to communicate with any other feasible devices. For example, execution of the communication module 1048 may enable the device 1000 to communicate via cellular networks conforming to any of the LTE standards promulgated by the 3rd Generation Partnership Project (3GPP) working group, Wi-Fi networks conforming to any of the IEEE 802.11 standards, Bluetooth protocols put forth by the Bluetooth Special Interest Group (SIG), Ethernet protocols, or the like. In some embodiments, execution of the communication module 1048 may enable the device 1000 to communicate with other remote computing devices not shown. In some other embodiments, execution of the communication module 1048 may implement encryption and/or decryption procedures.

EXAMPLES

FIGS. 11-14 illustrate one example of an apparatus and method of using it as described herein. For example, in FIG. 11 a system as described herein has been installed into a hospital room 1101. In this example, the room is a fairly typical 9 ft×13 ft psychiatric hospital room. The room includes a pair of beds 1103, 1015, and a door into/out of the room 1111, as well as a bathroom door 1123. The radar sub-system 1113 includes a mmWave radar that is mounted overhead, e.g., near the ceiling (approximately 9 feet up), and the sensor unit field of view covers the entire room 1115. The image on the right shows a video still of the actual room, with a person in each bed. On the left, the image shows a mapping of the room 1121 (e.g. floor plan) indicated the regions corresponding to the two beds 1103, 1105 and nightstands, as well as two point clouds corresponding to each patient. In this example, the visualization shows a center dot (centroid) 1150 corresponding to each person 1107,1109. On the bed. The visualization also shows a scatter cloud of dots indication motion of the person, e.g., as shown on the bottom left 1153, arm motion by the patient results in smaller dots, which may be size and/or color coded to indicate the intensity (e.g., acceleration, and/or magnitude) of the relative motion of these body parts.

Figure 11:
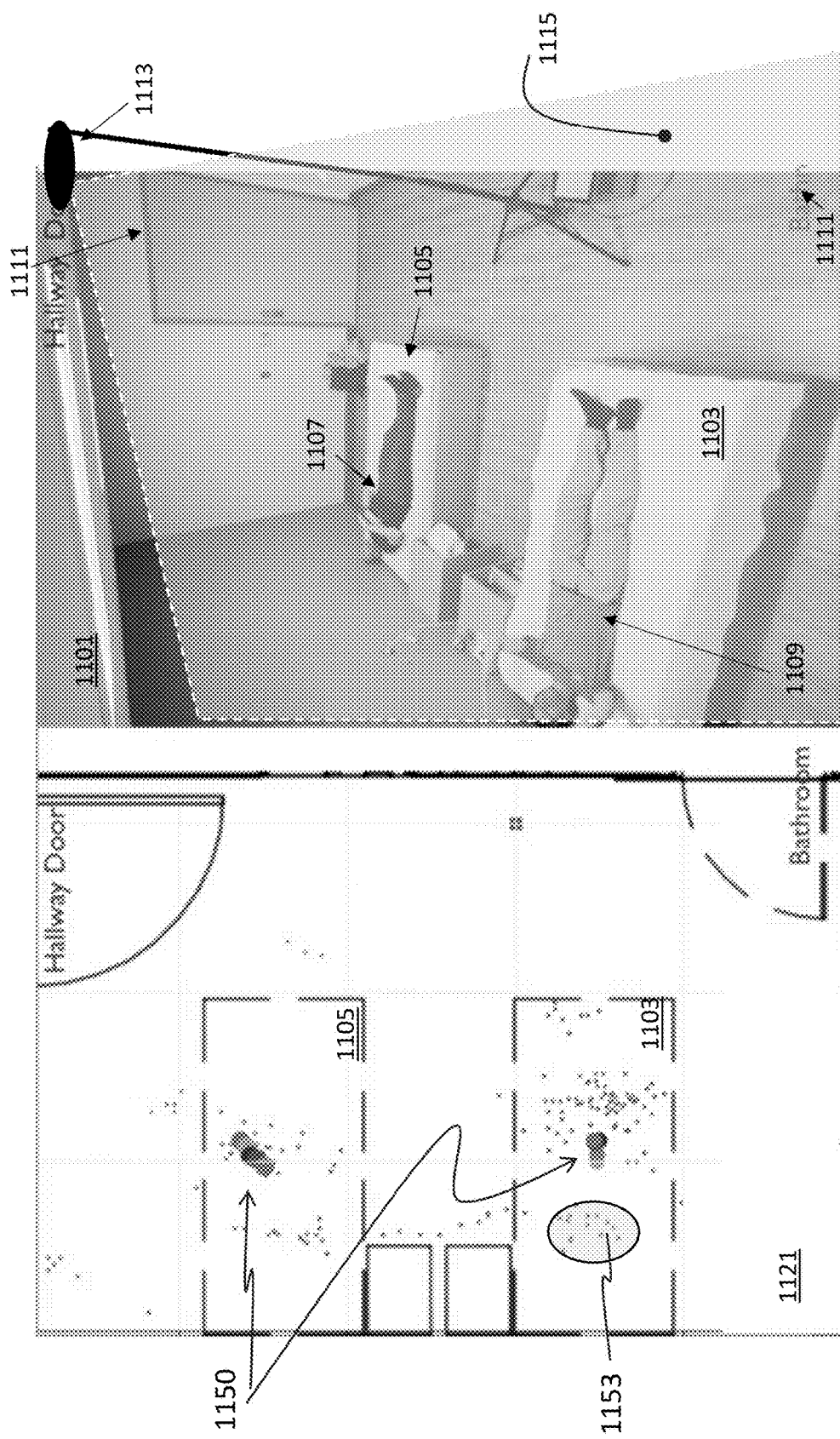
FIG. 11 shows an example of the operation of a system as described herein, including a user interface (left) and a corresponding video image (right).
Figure 12:
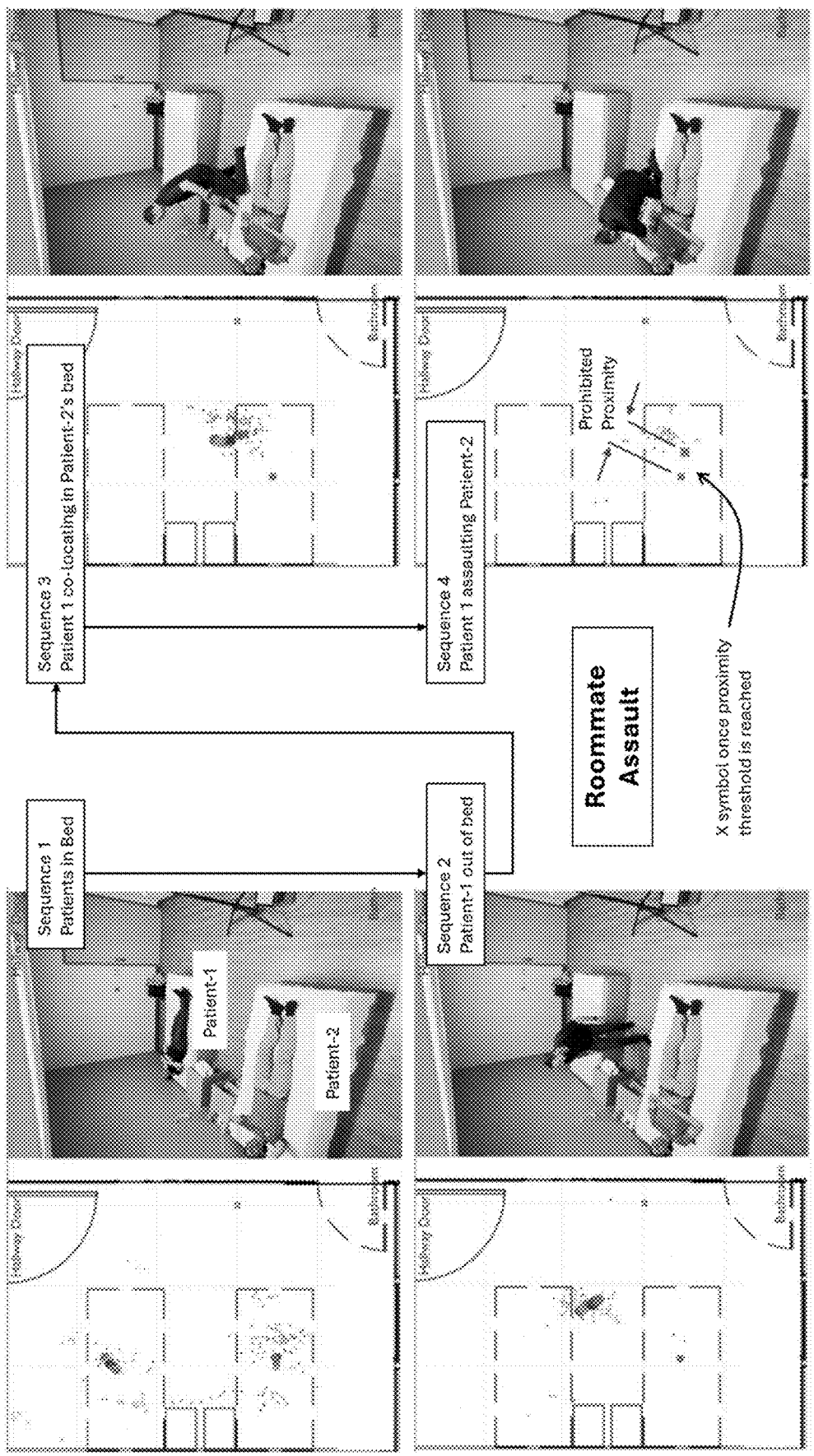
FIG. 12 is an example illustrating detection of assault of a patient by a roommate.

FIG. 12 illustrates an example of detecting an assault of a patient by another patient, such as a roommate, using the apparatus as shown in FIG. 11. The upper left images show the room plan and a photograph of the patients in the room. In this example, the first patient is lying on a first bed, and the second patient is lying on the second bed. The point cloud shows the centroid for the first patient and the second patient on their respective beds. Each patient has a centroid and point of the point cloud indicating movement above a threshold. In some cases the apparatus may determine if the patients each have a wearable sensor indicating their identity. The bottom left images show the second patient getting out of bed, approaching the sleeping first patient (as shown by the point cloud in the room plan view approaching the patient point cloud in the first bed region). In the upper right views, the second patient has entered the first bed zone (which may trigger an alarm, alert, etc.) which is apparent to the system as the patient point clouds, including the centroid indicating each patient, are within the monitoring zone corresponding to the first bed. Finally, the bottom right images show the second patient in very close proximity to the patient, and (as confirmed by the video image on the right), assaulting the patient. In the room plan display, the centroid for the second patient is shown as an "x" indicating the proximity threshold has been breached by this patient. Assault alarms may be triggered, altering the caregivers/security.

Figure 13:
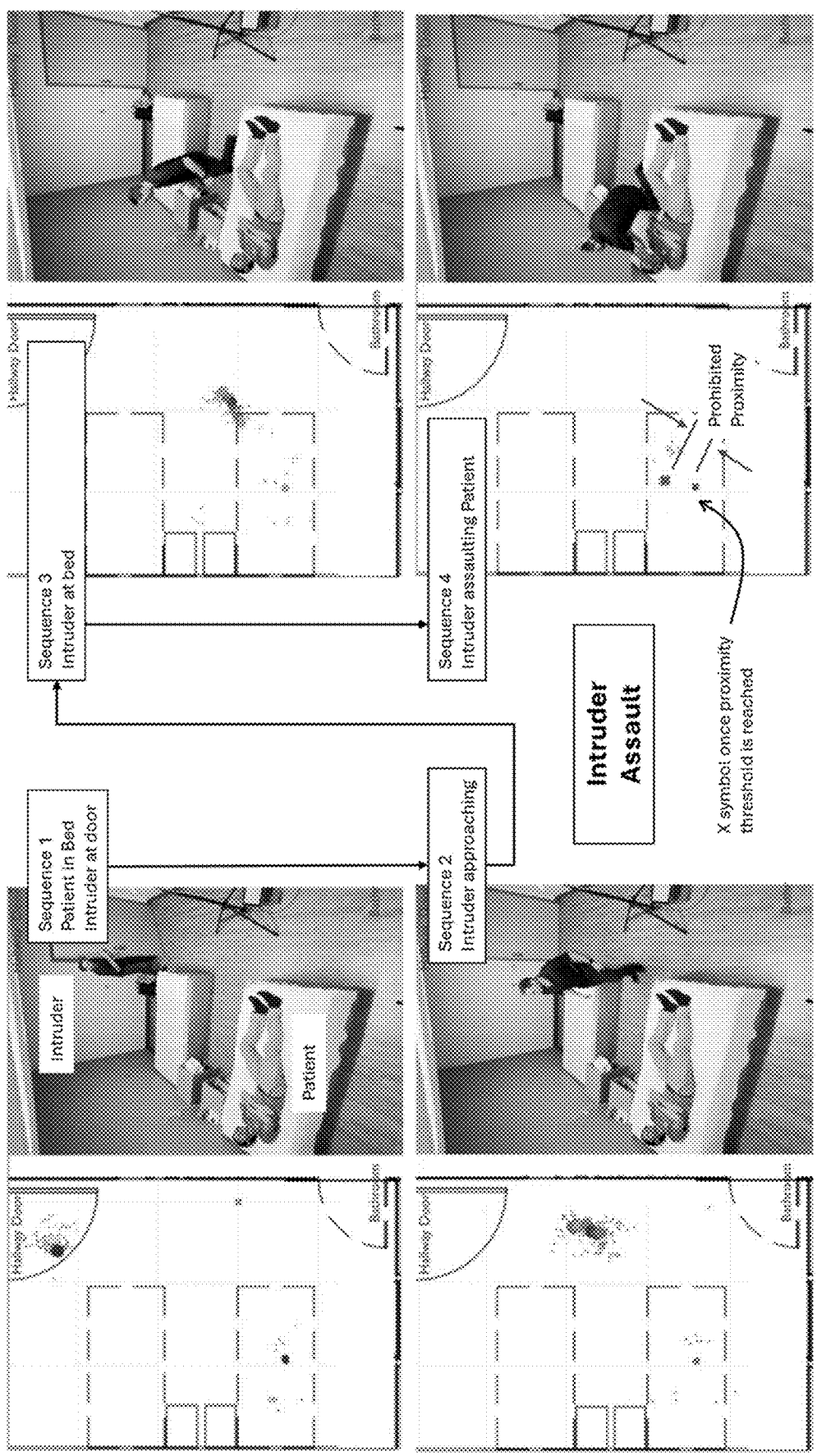
FIG. 13 is an example illustrating detection of assault of a patient by an intruder.

FIG. 13 illustrates an example of detecting an assault of a patient by an intruder using the apparatus as shown in FIG. 11. The upper left images show the room plan and a photograph of the patient in his room. In this example, the first patient is lying on the bed, and an intruder enters the room. The point cloud shows the centroid for the sleeping and relatively inactive patient on the bed, while the centroid at the door shows the movement of the intruder entering the room. An initial alarm may be triggered to indicate room entry. In some cases the apparatus may determine if the intruder has a wearable sensor indicating their identity (e.g., to distinguish staff, patients, etc.) and may respond accordingly to notify and/or alert the staff if a disallowed intruder is present. The bottom left images show the intruder approaching the sleeping patient (as shown by the point cloud in the room plan view approaching the patient point cloud in the bed region). In the upper right views, the intruder has entered the bed zone (which may trigger an alarm, alert, etc.) which is apparent to the system as the point cloud, including the centroid indicating the intruder, is within the monitoring zone corresponding to the bed, occupied by the patient. Finally, the bottom right images show the intruder in very close proximity to the patient, and (as confirmed by the video image on the right), assaulting the patient. In the plan display, the centroid for the intruder is shown as an "x" indicating the proximity threshold has been breached (e.g., the intruder point cloud is too close to the patient point cloud).

Figure 14:
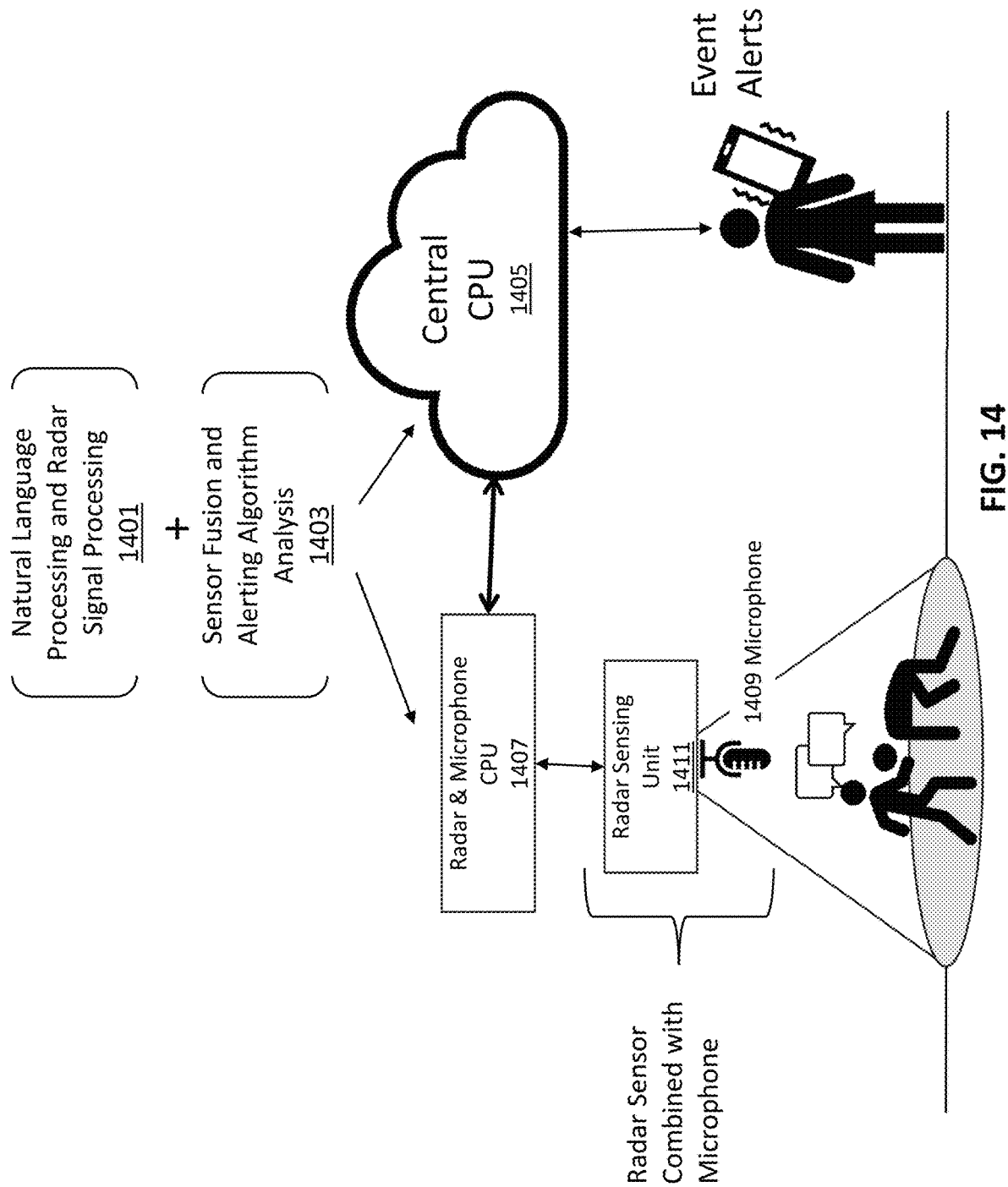
FIG. 14 schematically illustrates an example of an apparatus to detect assaults using both audio and radar as described herein.

FIG. 14 shows an example of an apparatus configured to include audio monitoring in combination with radar (e.g., mmWave, etc.) monitoring. In FIG. 14, a system including one or more processors, which may be remote 1405 or local, may include control logic for controlling operation of the auditory monitoring subsystem that may include a microphone. The one or more processor may include algorithms for processing sound detected by the microphone 1409, including natural language processing 1401. The same one or more processors 1407 may also control and process signals from the radar system, and/or may monitor to trigger an alert if an assault or self-harm incident is detected 1403. For example, in FIG. 14 the apparatus 1413 includes a radar sensing unit 1411, processors, radar sub-system, and an audio subsystem, including the microphone 1409.

For example a system such as the one shown in FIG. 14 may perform a method of monitoring one or more patients within a healthcare setting to detect and/or prevent assault.

For example, any of these methods may include receiving or obtaining from a transducer 1411, a three-dimensional (3D) point cloud of a room. The method may then include determining, based on the 3D point cloud, a location of a first person in the first room and/or a location of a second person in the first room.

Optionally, as mentioned above, the apparatus may be configured to engage in audio monitoring within the room when the first person is within a proximity threshold to the second person. Alternatively, the apparatus and method may monitor continuously or periodically, regardless of proximity. In some cases the method may include identifying, from the audio monitoring, an audio signal indicating distress; and triggering an assault alert when the audio signal indicating distress is detected.

In general, the audio signal may be examined to indicate if a distress signal is detected, comprises using natural language processing with the audio monitoring to identify verbal distress indicators. The verbal distress indicators may be based on the content, which may be identified by a natural language processor 1401, and/or based on volume or changes in volume (e.g., to detect a shout, cry, etc.). Thus, identifying the audio signal indicating distress may comprise identifying audio signals that exceed a volume threshold.

Any of these apparatuses may be configured to 'forget' audio signals received. This may be referred to as a monitoring audio using an amnesic audio monitor that does not record or transmit audio signals or transcriptions of audio signals. The software, hardware and/or firmware may be configured to analyze and destroy the verbatim audio signal.

As mentioned, the apparatus and/or method may be configured to trigger audio monitoring only when two or more people are within a threshold proximity (distance) of each other (e.g., 1 feet, 1.5 feet, 2 feet, 3 feet, 4 feet, 5 feet, etc.). In any of these cases, the audio monitoring may be disengaged when the first person is outside of the proximity threshold relative to the second person. The assault alert may be triggered when the audio signal indicating distress is detected further comprises triggering the assault alert when the audio signal indicating distress is detected and when a contact event is detected between the first person and the second person based on the 3D point cloud.

Figure 15:
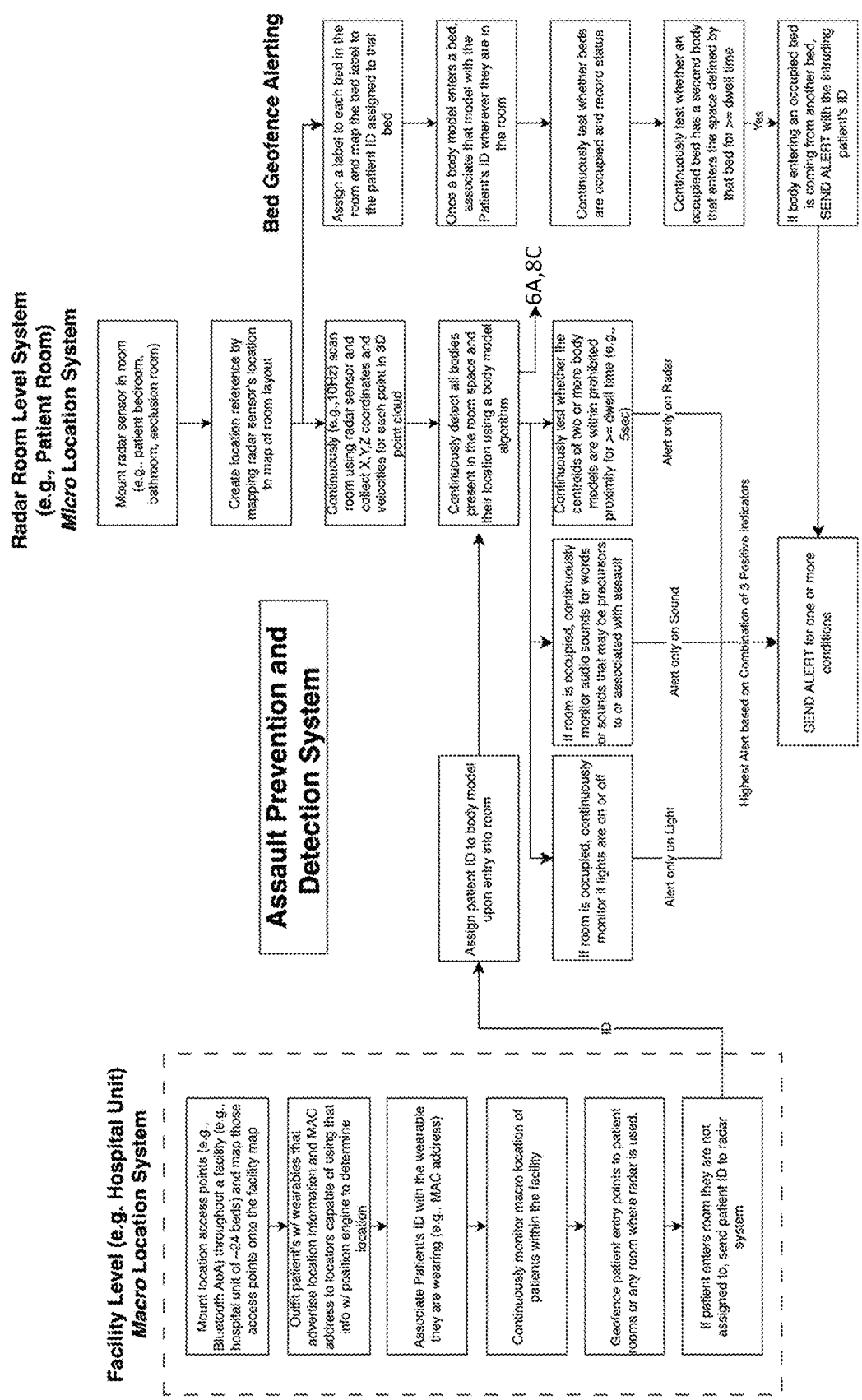
FIG. 15 schematically illustrates an example of an apparatus for detecting and preventing assault.

As mentioned, any of the apparatuses described herein may be combined into an assault prevention and detection system, as shown in FIG. 15. In this example, the apparatus includes a facility-level (macro location) monitoring subsystem that may include more traditional monitoring of patients using wearable components and one or more stations. The wearable data may be received and may inform the assault prevention and detection by tracking the patient outside of the room(s) and/or within a room. Within a room or other portion of the facility, a radar (e.g., mmWave, etc.) subsystem may be included and a variety of different techniques for determining assault as discussed at length above may also or alternatively be include.

In general, any these apparatuses may include a display or displays showing individuals (patients, caregivers, etc.) within the monitored regions as point clouds. In some cases historical movements may be shown as a trail of fainter and transient symbols (e.g., movement of the centroids and other points). As mentioned above, the radar data may be actively monitored and may trigger alarms. This data (typically room plan level of data; video data is not typically recorded) may be stored and/or transmitted.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for case of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of detecting an assault within a room of a healthcare facility, the method comprising:
    generating, using a radar system within the room, a point cloud derived from an image of the room, wherein the room includes a bed at a fixed location within a coordinate system corresponding to the room;
    determining, from the point cloud, a location of a representative first point or first set of points of the point cloud corresponding to a first person;
    determining, from the point cloud, a location of a second representative point or second set of points of the point cloud corresponding to a second person;
    determining, in a processor, that an assault has occurred when the first representative point or first set of points and the second representative point or second set of points are both colocalized within a region of the coordinate system comprising the bed for greater than a duration threshold; and
    triggering an assault alert when the processor determines that the assault has occurred.

2. The method of claim 1, wherein determining the location of the representative first point or first set of points of the point cloud corresponding to the first person comprises determining a relative position of a first centroid of the first set of points, and wherein determining the location of the second representative point or second set of points of the point cloud corresponding to the second person comprises determining a relative position of a second centroid of the second set of points.

3. The method of claim 2, wherein determining the location of the representative first point or first set of points of the point cloud corresponding to the first person comprises determining based on a relative movement of points within the point cloud, and wherein determining the location of the representative second point or second set of points of the point cloud corresponding to the second person comprises determining based on relative movement of points within the point cloud.

4. The method of claim 1, wherein triggering comprises triggering the assault alert when the first representative point or first set of points and the second representative point or second set of points are both within the region of the coordinate system comprising the bed for greater than a duration threshold of 10 seconds or more.

5. The method of claim 4, wherein the duration threshold is 30 seconds or more.

6. The method of claim 1, wherein the region of the coordinate system comprising the bed extends in the coordinate system above the bed by 2 feet or more and adjacent to the bed by 0.5 feet or less.

7. The method of claim 1, further comprising identifying the first person and/or the second person based on a wearable sensor worn by the first person and/or the second person.

8. The method of claim 1, further comprising identifying the first person and/or the second person based on a patient identification associated with the bed and dwell time in the bed.

9. The method of claim 1, wherein triggering the assault alert comprises one or more of: sending a text, sending an email, emitting an alarm.

10. The method of claim 1, wherein triggering the assault alert comprises triggering the alert to a healthcare worker.

11. The method of claim 1, wherein the radar system comprises a millimeter wave radar system.

12. The method of claim 11, wherein the predetermined distance threshold comprises 3 feet or less.

13. A method of detecting an assault within a room of a healthcare facility, the method comprising:
- generating, using a millimeter wave radar system within the room, a point cloud derived from an image of the room, wherein the room includes a bed at a fixed location within a coordinate system corresponding to the room;
- determining, from the point cloud, a location of a representative first point or first set of points of the point cloud corresponding to a first person, wherein first set of points is identified based on relative movement of points within the point cloud;
- determining, from the point cloud, a location of a second representative point or second set of points of the point cloud corresponding to a second person, wherein second set of points is identified based on relative movement of points within the point cloud;
- determining, in a processor, that an assault has occurred when the first representative point or first set of points and the second representative point or second set of points are both colocalized within a region of the coordinate system comprising the bed for greater than a duration threshold of 10 seconds or more; and
- triggering an assault alert when the processor determines that the assault has occurred.

14. A system for detecting an assault within a room of a healthcare facility, system comprising:
- a radar transducer;
- one or more processors comprising a non-transitory computer-readable storage medium including instructions that, when executed by one or more processors, cause the one or more processors to perform a method comprising:
  - generating, using a radar system within the room, a point cloud derived from an image of the room, wherein the room includes a bed at a fixed location within a coordinate system corresponding to the room;
  - determining, from the point cloud, a location of a representative first point or first set of points of the point cloud corresponding to a first person;
  - determining, from the point cloud, a location of a second representative point or second set of points of the point cloud corresponding to a second person;
  - determining, in the one or more processors, that an assault has occurred when the first representative point or first set of points and the second representative point or second set of points are both colocalized within a region of the coordinate system comprising the bed for greater than a duration threshold; and
  - triggering an assault alert when the one or more processors determines that the assault has occurred.

15. The system of claim 14, wherein determining the location of the representative first point or first set of points of the point cloud corresponding to the first person comprises determining a relative position of a first centroid of the first set of points, and wherein determining the location of the second representative point or second set of points of the point cloud corresponding to the second person comprises determining a relative position of a second centroid of the second set of points.

16. The system of claim 15, wherein determining the location of the representative first point or first set of points of the point cloud corresponding to the first person comprises determining based on a relative movement of points within the point cloud, and wherein determining the location of the representative second point or second set of points of the point cloud corresponding to the second person comprises determining based on relative movement of points within the point cloud.

17. The system of claim 14, wherein triggering comprises triggering the assault alert when the first representative point or first set of points and the second representative point or second set of points are both within the region of the coordinate system comprising the bed for greater than a duration threshold.

18. The system of claim 17, wherein the duration threshold is 30 seconds or more.

19. The system of claim 17, wherein the duration threshold is 10 seconds or more.

20. The system of claim 14, wherein the region of the coordinate system comprising the bed extends in the coordinate system above the bed by 2 feet or more and adjacent to the bed by 0.5 feet or less.

21. The system of claim 14, wherein the instructions are further configured to cause the one or more processors to perform the method comprising: identifying the first person and/or the second person based on a wearable sensor worn by the first person and/or the second person.

22. The system of claim 14, wherein the instructions are further configured to cause the one or more processors to perform the method comprising: identifying the first person and/or the second person based on a patient identification associated with the bed and dwell time in the bed.

23. The system of claim 14, wherein triggering the assault alert comprises one or more of: sending a text, sending an email, emitting an alarm.

24. The system of claim 14, wherein triggering the assault alert comprises triggering the alert to a healthcare worker.

25. The system of claim 14, wherein the radar system comprises a millimeter wave radar system.

\* \* \* \* \*